United States Patent
Liu et al.

(10) Patent No.: US 11,488,010 B2
(45) Date of Patent: Nov. 1, 2022

(54) INTELLIGENT ANALYSIS SYSTEM USING MAGNETIC FLUX LEAKAGE DATA IN PIPELINE INNER INSPECTION

(71) Applicant: Northeastern University, Shenyang (CN)

(72) Inventors: Jin hai Liu, Shenyang (CN); Ming rui Fu, Shenyang (CN); Sen xiang Lu, Shenyang (CN); Hua guang Zhang, Shenyang (CN); Da zhong Ma, Shenyang (CN); Gang Wang, Shenyang (CN); Jian Feng, Shenyang (CN); Xin bo Zhang, Shenyang (CN); Ge Yu, Shenyang (CN); Hong qiu Wei, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 635 days.

(21) Appl. No.: 16/345,657

(22) PCT Filed: Feb. 13, 2019

(86) PCT No.: PCT/CN2019/074907
§ 371 (c)(1),
(2) Date: Apr. 26, 2019

(87) PCT Pub. No.: WO2020/133639
PCT Pub. Date: Jul. 2, 2020

(65) Prior Publication Data
US 2020/0210826 A1    Jul. 2, 2020

(30) Foreign Application Priority Data
Dec. 29, 2018 (CN) .......................... 201811633698.5

(51) Int. Cl.
*G06N 3/08* (2006.01)
*G06N 3/04* (2006.01)
(Continued)

(52) U.S. Cl.
CPC ............... *G06N 3/08* (2013.01); *G01N 27/82* (2013.01); *G06N 3/0481* (2013.01); *G06N 5/003* (2013.01); *G06N 20/20* (2019.01); *G06Q 10/20* (2013.01)

(58) Field of Classification Search
CPC ........ G06N 3/08; G06N 20/20; G06N 3/0481; G06N 5/003; G01N 27/82; G06Q 10/20
(Continued)

(56) References Cited

U.S. PATENT DOCUMENTS

2018/0275099 A1* 9/2018 Huang .................... G01N 27/83
2019/0178844 A1* 6/2019 Lott ...................... G01R 33/028
(Continued)

FOREIGN PATENT DOCUMENTS

CN    102122351 A    7/2011
CN    106247171 A    12/2016
(Continued)

OTHER PUBLICATIONS

ASME et al., "Manuel for determining the remaining strength of corroded pipelines", ASSME B31G-1991 (Year: 1991).*
(Continued)

*Primary Examiner* — Hal Schnee
(74) *Attorney, Agent, or Firm* — Muncy, Geissler, Olds & Lowe, P.C.

(57) ABSTRACT

Provided is an intelligent analysis system for inner detecting magnetic flux leakage (MFL) data in pipelines, including a complete data set building module, a discovery module, a quantization module and a solution module, wherein: a complete data set building method is adopted in the com-
(Continued)

plete data set building module to obtain a complete magnetic flux leakage data set; a pipeline connecting component discovery method is adopted in the discovery module to obtain the precise position of a weld; an anomaly candidate region search and identification method is adopted in the discovery model to find out magnetic flux leakage signals with defects; a defect quantization method based on a random forest is adopted in the quantization module to obtain a defect size; and a pipeline solution based on an improved ASME B31G standard is adopted in the solution module to output an evaluation result.

7 Claims, 15 Drawing Sheets

(51) Int. Cl.
  G01N 27/82 (2006.01)
  G06Q 10/00 (2012.01)
  G06N 5/00 (2006.01)
  G06N 20/20 (2019.01)
(58) Field of Classification Search
  USPC .......................................................... 706/20
  See application file for complete search history.

(56) References Cited

U.S. PATENT DOCUMENTS

| | | | | |
|---|---|---|---|---|
| 2019/0226322 | A1* | 7/2019 | Khalaj Amineh | ....... G01V 3/38 |
| 2020/0348262 | A1* | 11/2020 | Guo | ......................... F17D 5/005 |
| 2021/0285915 | A1* | 9/2021 | Chen | ..................... E21B 47/092 |

FOREIGN PATENT DOCUMENTS

| | | |
|---|---|---|
| CN | 106870957 A | 6/2017 |
| CN | 106950276 A | 7/2017 |
| CN | 107842713 A | 3/2018 |
| JP | 2002122571 A | 4/2002 |

OTHER PUBLICATIONS

Khodayari-Rostamabad, et al., "Machine Learning Techniques for the Analysis of Magnetic Flux Leakage Images in Pipeline Inspection", IEEE Transactions on Magnetics, vol. 45, No. 8, Aug. 2009 (Year: 2009).*

Liu Jinhai et al.; "Defect Recognition Method Based on MFL (Magnetic Flux Leakage) Inner Detection"; Chinese Journal of Scientific Instrunent.

International Search Report Based on Application No. PCT/CN2019/074907 dated Sep. 26, 2019.

* cited by examiner

INTELLIGENT ANALYSIS SYSTEM USING MAGNETIC FLUX LEAKAGE DATA IN PIPELINE INNER INSPECTION

BACKGROUND OF THE INVENTION

1. Field of the Invention

The invention relates to the technical field of pipeline detection, and particularly relates to an intelligent analysis system for inner detecting magnetic flux leakage (MFL) data in pipelines.

2. The Prior Arts

Pipeline transportation is widely applied as a continuous, economical, efficient and green transportation means. The design life of pipelines specified in the national standard is 20 years. As increment of operating time, the pipeline condition deteriorates year by year and potential dangers can be increased violently due to pipeline material problems, construction, corrosion and damages caused by external force. Once leakage occurs, not only can atmospheric pollution be caused, but also violent explosion can be caused easily. Therefore, safety inspection and maintenance need to be performed regularly on pipelines so as to ensure the safety of energy transportation and ecological environment.

Non-destructive testing (NDT) is widely applied as an important means for pipeline safety maintenance. At present, main methods for pipeline detection comprise MFL detection, eddy current detection and ultrasonic detection. Among them, the MFL detection is widely applied in nearly 90% of in-service pipelines, which is a defect detection technology for ferromagnetic materials with a relatively-mature technology and the most extensive application in foreign developed countries. Currently, many analytical researches exist on MFL data, including data preprocessing, detection, size inversion, data presentation and the like. However, existing researches on analysis of MFL data pay more attention to development of local points and lack of systemic view for data analysis, most of theoretical methods and application technologies lack generality and transplantability and fail to effectively combine an intelligent technology with analysis of MFL data, and a set of practical and feasible data analysis system which can be widely transplanted is difficult to form.

The invention invents an analysis software system for inner detecting MFL data in pipelines from the perspectives of surfaces and bodies, and invents a data analysis method from the perspective of artificial intelligence, a data preprocessing method based on time-domain-like sparse sampling and KNN-softmax, a pipeline connecting component based on a combination of a selective search and a convolutional neural network (CNN), an abnormal candidate region search and identification method based on a Lagrange multiplication framework and multi-source MFL data fusion, a defect inversion method based on a random forest, and a pipeline defect evaluation method based on improved standard ASME B31G.

SUMMARY OF THE INVENTION

Based on the above technical problems, the invention provides an intelligent analysis system for inner detecting MFL data in pipelines, wherein the intelligent analysis system for inner detecting MFL data in pipelines comprises a complete data set building module, a discovery module, a quantization module and a solution module.

Originally-sampled MFL data is connected with the complete data set building module, the complete data set building module is connected with the discovery module through a complete MFL data set, the discovery module is connected with the quantization module, and the quantization module is connected with the solution module.

The complete data set building module is used for data missing reconstruction and noise reduction operation on original MFL data for inner detection, and the complete data set building method based on time-domain-like sparse sampling and KNN-softmax is adopted to build the complete MFL data set.

In the complete data set building module, the originally-sampled MFL data is used as multi-source data information, specifically comprising: axial data, radial data, circumferential data and α-direction data.

The discovery module is used for defect detection and comprises component detection and anomaly detection, wherein the component detection completes detection of welds and flanges of pipeline connecting components; for the discovery module, a pipeline connecting component discovery method based on a combination of a selective search and a convolutional neural network (CNN) is adopted to obtain the precise position of a weld; and the whole magnetic flux leakage signals are divided into u+1 patches according to the precise position of the weld, and one patch of MFL signals is taken to find out MFL signals with defects by the abnormal candidate region search and identification method based on a Lagrange multiplication framework and multi-source MFL data fusion.

The anomaly detection comprises: detection of defects, valves, meters and metal increment, and finally obtaining defect signals.

The quantization module completes mapping from the defect signals to physical characteristics, and finally gives the defect size, namely length, width and depth, by the defect quantization method based on a random forest.

The solution module extracts all defect length columns, depth columns and pipeline property parameters in defect information from the complete MFL data set, and finally gives the evaluation results including maintenance indexes and recommendations for a single defect position, by using a pipeline solution improved based on the standard ASME B31G through a maintenance decision model, wherein the pipeline property parameters comprise minimum yield strength SMYS, minimum tensile strength SMTS, nominal outside diameter $D_d$, wall thickness $t_a$ and maximum allowable operating pressure MAOP; and a complete data set building method based on time-domain-like sparse sampling and KNN-softmax is adopted in the complete data set building module to obtain the complete MFL data set, and specifically comprises the following steps of:

Step 1.1: collecting the original MFL detection data directly from a MFL detection tool of submarine pipelines, and performing secondary baseline correction on data, wherein the originally-sampled MFL data is used as multi-source data information, specifically comprising: axial data, radial data, circumferential data and α-direction data.

Step 1.1.1: performing primary baseline correction on the original MFL detection data, which is expressed as:

$$x'_{i_a j_a} = x_{i_a j_a} - \frac{1}{k_c}\sum_{i_a=1}^{k_c} x_{i_a j_a} + s(j_a = 1, 2, \ldots, n_a)$$

wherein, $k_c$ is the number of mileage count points; $x_{i_aj_a}$ is the original value of channel $j_a$ in the position of mileage count point $i_a$; $x'_{i_aj_a}$ is the corrected value of channel $j_a$ in the position of mileage count point $i_a$; s is the median value of all channels, and $n_a$ is the number of channels of the MFL inner detection tool.

Step 1.1.2: removing an over-limit value $\pm T_a$ in the data, and assigning the position value of the over-limit value to the median value S of all channels, which is expressed as:

$$x'_{i_aj_a}=s, \text{ if } x'_{i_aj_a}>|T_a|$$

Step 1.1.3: performing secondary baseline correction on data with the over-limit value removed:

$$x''_{i_aj_a} = x'_{i_aj_a} - \frac{1}{k_c}\sum_{i_a=1}^{k_c} x'_{i_aj_a} + s'(j_a = 1, 2, \ldots, n_a)$$

wherein, $k_c$ is the number of mileage count points; $x'_{i_aj_a}$ is the primary correction value of channel $j_a$ in the position of mileage count point $i_a$; $x''_{i_aj_a}$ is the value of channel $j_a$ in the position of the mileage count point $i_a$ after secondary correction; s' is the median value of all channels after primary correction.

Step 1.2: performing time-domain-like sparse sampling anomaly detection treatment on data after secondary baseline correction.

Step 1.2.1: performing abnormal signal time-domain-like modeling on data after secondary baseline correction, namely corresponding the sampling points to time information.

Step 1.2.1.1: performing mathematical modeling on anomaly parts, wherein the modeling result is represented as:

$$f(t)' = p(t)' * \sin(2\pi nft) \text{ wherein}$$

$$p(t)' = \begin{cases} 1, t \in [0, t_1] \cup [t_2, 0.2] \\ a, t \in (t_1, t_2) \end{cases}$$

wherein p(t)' represents a voltage swell compensating signal of MFL detection in pipelines, f represents a signal sampling rate, t represents sampling time, $t_1,t_2$ represents sampling intervals, a represents power pipelines, n is a system fluctuation amplitude coefficient, and f(t)' is voltage waveform change frequency.

Step 1.2.1.2: setting the variation of abnormal data of MFL detection by using the range as a collection unit, regarding the variance of pipeline system voltage data collected in each range as the data variation by using $k_e$ collected data as a range, and judging the degree of voltage signal fluctuation of MFL data. The specific calculation method comprises the steps:

$$\Delta f_0^2 = \sum_{i=1}^{k_e}(f_i - \overline{f})^2 / k_e \text{ namely}$$

$$\Delta f_0 = \sqrt{\sum_{i_c=1}^{k_e}(f_{i_c} - \overline{f})^2 / k_e}$$

wherein $f_{i_c}$ represents sampling point $i_c$ within a given range, $\overline{f}$ represents the mean value of pipeline system voltage data collected in the range, and $\Delta f_0$ represents the degree of voltage signal fluctuation of MFL data.

Step 1.2.1.3: calculating the voltage state variation $\Delta f_{i_c}$, wherein the formula is as follows:

$$\Delta f_{i_c} = \sqrt{\sum_{i_c=2}^{k_e}(f_{i_c} - f_1)^2 / (k_e - 1)}$$

Step 1.2.2: judging abnormal signals, if $\Delta f_{i_c} > 3*\Delta f_0$, regarding data at this time as an anomaly generated by external disturbance, which is an anomaly part.

Step 1.2.3: manually extracting the training sample features $T=(X_1, X_2, \ldots, X_7, X_{i_b})$, and manually extracting the testing sample features $T'=(X'_1, X'_2, \ldots, X'_7, X'_{j_b})$; manually extracting features $T''=(X''_1, X''_2, \ldots, X''_7, X''_{k_d})$ of the data to be interpolated, wherein $i_b$, $j_b$, $k_d$ is the number of features.

Step 1.3: performing missing interpolation treatment based on KNN-logistic regression on the MFL data of submarine pipelines.

Step 1.3.1: training and testing the KNN and softmax regression models.

Step 1.3.1.1: dividing the feature sample data T into two parts, wherein one part of the feature sample data $X_{Train}$ is used for training the KNN model, and the other part of the feature sample data $T_{Test}$ is used for testing the KNN model.

Step 1.3.1.2: inputting $X_{Train}$ into the KNN model, setting the value of K, and training the KNN model.

Step 1.3.1.3: inputting $T_{Test}$ into the trained KNN model for classification, calculating the discrimination error rate, if the error rate is less than a threshold, changing the training and testing samples by a V-fold cross-validation method, and continuing performing training; else, making K=K+1, continuing training the model, and stopping training when K is greater than the threshold M.

Step 1.3.1.4: (for the feature sample data $T_{i_d}$ ($i_d$=1, ..., $m_d$) assigned to each category, the data set corresponding to the feature sample is $D_{i_d}$ ($i_d$=1, ..., $m_d$)) normalizing $T_{i_d}$ ($i_d$=1, ..., $m_d$) and $D_{i_d}$ ($i_d$=1, ..., $m_d$) respectively to obtain $T'_{i_d}$ ($i_d$=1, ..., $m_d$) and $D'_{i_d}$ ($i_d$=1, ..., $m_d$), expressed as:

$$T'_{i_d} = \frac{T_{i_d} - \overline{T_{i_d}}}{\max(T_{i_d}) - \min(T_{i_d})}, D'_{i_d} = \frac{D_{i_d} - \overline{D_{i_d}}}{\max(D_{i_d}) - \min(D_{i_d})}$$

$\overline{T_{i_d}}$ is the mean value of feature sample data; $\overline{D_{i_d}}$ is the mean value of data corresponding to feature samples.

Step 1.3.1.5: adding a softmax regression model at a node of each class, wherein a hypothesis function is expressed in the formula:

$$h_\theta(x^{i_e}) = \begin{pmatrix} p(y^{(i_e)} = 1 \mid x^{(i_e)}; \theta) \\ p(y^{(i_e)} = 2 \mid x^{(i_e)}; \theta) \\ M \\ p(y^{(i_e)} = k_f \mid x^{(i_e)}; \theta) \end{pmatrix}$$

wherein, x is the sample input value, y is the sample output value, θ is the training model parameter, $k_f$ is the vector dimension, $i_e$ is category $i_e$ in the classification and $p(y=i_e|x)$ represents the estimated probability value for category $i_e$.

Step 1.3.1.6: inputting the training sample set $D'_{i_d}$ at each node into the softmax regression model to obtain the output value $y^{(i_e)}$" after interpolation, wherein the loss function $J(\theta)$ is:

$$J(\theta) = -\frac{1}{m_d}\left[\sum_{i_e=1}^{m_d}\sum_{j_e=1}^{k_f} 1\{y^{(i_e)} = j_e\}\log\frac{e^{\theta_{j_e}^T x^{(i_e)}}}{\sum_{l=1}^{k_f} e^{\theta_{j_e}^T x^{(i_e)}}}\right]$$

x is the sample input value; y is the sample output value; θ is the training model parameter; $k_f$ is the vector dimension; $i_e$ is category $i_e$ in the classification; $j_e$ is sample input $j_e$ in the classification; $m_d$ is the number of samples; 1{•} is the indicative function, and if value in braces is the true value, the expression value is 1.

Step 1.3.2: calculating the loss function of the predicted result, and setting the threshold to be P, if $J(\theta) > P$, returning to Step 1.3.2.2, making K=K+1, and continuing training the model until $J(\theta) \le P$, when K is greater than the threshold M, stopping training, and outputting the output value $y^{(i)}$" after interpolation.

Step 1.3.3: inputting the data features and data sets to be interpolated into the trained model to realize interpolation of missing data so as to obtain the complete MFL data set, wherein because the originally-sampled MFL data is used as the multi-source data information, a complete multi-source MFL data set is obtained.

The discovery module adopts the pipeline connecting component discovery method based on a combination of a selective search and a convolutional neural network (CNN) to obtain the precise position of a weld, specifically comprising the following steps.

Step 2.1: extracting the MFL signal data of a pipeline: from a complete MFL data set, dividing a whole MFL signal matrix D into $n_g$ patches of the pipeline MFL signal matrix $D_1, D_2, \ldots, D_{n_x}$ in an equal proportion, wherein each divided MFL signal matrix consists of $M_{n_g} \times N_{n_g}$ data.

Step 2.2: color diagram of MFL signal conversion: setting the upper limit $A_{top}$ of a signal amplitude and the lower limit $A_{floor}$ of the signal amplitude, and converting the pipeline MFL signal matrices $D_1, D_2, \ldots, D_{n_g}$ into pipeline color diagram matrices $C_1, C_2, \ldots, C_{n_g}$ accordingly.

Step 2.2.1: setting the upper limit $A_{top}$ of the signal amplitude and the lower limit $A_{floor}$ of the signal amplitude.

Step 2.2.2: converting the pipeline MFL signal matrices $D_1, D_2, \ldots, D_{n_g}$ into gray matrices $Gray_1, Gray_2, \ldots, Gray_{n_g}$ between 0 and 255 according to the following formula:

$$\begin{cases} gray_{ij} = 255, d_{ij} > A_{top} \\ gray_{ij} = \frac{255g(d_{ij} - A_{floor})}{A_{top} - A_{floor}}, A_{floor} < d_{ij} \le A_{top} \\ gray_{ij} = 0, d_{ij} \le A_{floor} \end{cases}$$

wherein $i \in M_{n_g}$, $j \in N_{n_g}$; $d_{ij}$ is a component element of the MFL signal matrix D, and $gray_{ij}$ is a component element of the gray matrix Gray.

Step 2.2.3: converting the gray matrices $Gray_1, Gray_2, \ldots, Gray_{n_g}$ into 3D color matrices $C_1, C_2, \ldots, C_{n_g}$ containing $R_1, R_2, \ldots, R_{n_g}, G_1, G_2, \ldots, G_{n_g}$ and $B_1, B_2, \ldots, B_{n_g}$ according to the following formula:

$$\begin{cases} r_{ij} = 0; g_{ij} = 4gray_{ij}; b_{ij} = c \cdot gray_{ij} \le c/4 \\ r_{ij} = 0; g_{ij} = c; b_{ij} = -4gray_{ij} + 2c \cdot c/4 \le gray_{ij} \le c/2 \\ r_{ij} = 4U_{ij} - 2c; g_{ij} = c; b_{ij} = 0 \cdot c/2 \le gray_{ij} \le 3c/4 \\ r_{ij} = c; g_{ij} = -4gray_{ij} + 4c; b_{ij} = 0 \cdot gray_{ij} > 3c/4 \end{cases}$$

wherein, $r_{ij}$ is a component element of matrix R, $g_{ij}$ is a component element of matrix G, $b_{ij}$ and is a component element of matrix B.

Step 2.3: selective search: for the color diagram $C_k$ of each segment of pipeline, extracting mc candidate regions $r_{k1}, r_{k2}, \ldots, r_{km_c}$ by selective search.

Step 2.3.1: for the color diagram $C_k$ of each segment of pipeline, using a division method to obtain a candidate region set $R_k = \{r_{k1}, r_{k2}, \ldots, r_{kw}\}$.

Step 2.3.2: Initializing a similarity set Sim=ϕ.

Step 2.3.3: calculating the similarities $sim\{r_{ka}, r_{kb}\}$ of all adjacent regions $r_{ka}, r_{kb}$ according to the following formula:

$$sim(r_{ka}, r_{kb}) = \sum_{K=1}^{N} \min(c_{ka}^K, c_{kb}^K)$$

Step 2.3.4: repeating Step 2.3.3 until the similarities of all adjacent regions are calculated, and updating the similarity set Sim according to the following formula:

$$Sim = Sim \cup sim(r_{ka}, r_{kb})$$

Step 2.3.5: finding the maximum similarity $sim\{r_{kc}, r_{kd}\} = \max(Sim)$ from Sim, and obtaining a merged region accordingly:

$$r_{ke} = r_{kc} \cup r_{kd}$$

removing $sim\{r_{kc}, r_{kd}\}$ from Sim.

Step 2.3.6: repeating Step 2.3.5 until Sim is empty so as to obtain $m_{c\ merged\ regions}\ r_{k1}, r_{k2}, \ldots r_{km_c}$ wherein these regions are candidate regions.

Step 2.4: convolution neural network: judging the extracted candidate regions by the convolutional neural network (CNN), and recording the position $Loc_1, Loc_2, \ldots, Loc_w$ and the score $Soc_1, Soc_2, \ldots, Soc_w$ of the weld judged by the convolutional neural network (CNN).

Step 2.5: non-maximum suppression: obtaining the precise position $L_1, L_2, \ldots, L_u$ of the weld in Step 2.4 according to the above position $Loc_1, Loc_2, \ldots, Loc_w$ and score $Soc_1, Soc_2, \ldots, Soc_w$ of the weld through the non-maximum suppression algorithm, wherein according to the precise position of the weld, the whole MFL signals are divided into u+1 patches, one patch of MFL signals is taken, the discovery module adopts an abnormal candidate region search and identification method based on a Lagrange multiplication framework and multi-source MFL data fusion to find out MFL signals with defects, specifically comprising the following steps.

Step 3.1: establishing a data reconstruction framework based on Lagrange multiplication.

Step 3.1.1: establishing a data reconstruction model $$\min_{A,E} \|A\|_* + \lambda\|E\|_1,$$

subject to P=A+E, wherein P is an observed matrix, E is an error matrix, A is a low-rank matrix after reconstruction, $\|\bullet\|_1$ represents the 1 norm of the matrix, $\|\bullet\|_*$ represents the nuclear norm of the matrix, and λ is the weight parameter.

Step 3.1.2: changing a constrained optimization model into an unconstrained optimization model, $$l(A,E,Y,\mu)=\|A\|_*+\lambda\|E\|_1+\langle Y,P-A-E\rangle+\mu/2\|P-A-E\|_F^2$$

wherein l represents the Lagrange function, $\langle \bullet \rangle$ represents the inner product of the matrix, $\mu$ is a penalty factor, Y is the Lagrange multiplication matrix, and the unconstrained model minimization problem can be solved through an iterative process as follows:

$$\begin{cases} A^{k+1} = \underset{A}{\arg\min}\, l(A, E, Y), (unchangedE) \\ E^{k+1} = \underset{E}{\arg\min}\, l(A, E, Y), (unchangedA) \\ Y^{k+1} = Y^k + \mu(P - A^{k+1} - E^{k+1}) \\ \mu^{k+1} = \rho\mu^k \end{cases}$$

Step 3.1.3: Iterative optimization, wherein the optimization model of matrix A is:

$$A^{k+1} = \underset{A}{\arg\min}\|A\|_* + \langle Y, P - A - E^k\rangle + \frac{\mu^k}{2}\|P - A - E^k\|_F^2$$

$$= \underset{A}{\arg\min}\|A\|_* + \frac{\mu^k}{2}\left\|A - \left(F - E^k + \frac{Y^k}{\mu^k}\right)\right\|_F^2$$

for the convenience of calculation, the nuclear norm minimization problem can be solved by a soft threshold operator, the calculation formula of the soft threshold is $(x, \tau) = \text{sgn}(x)(|x|-\tau)_+$, wherein $y_+ = \max(y,0)$, the operator can be used in the optimization process as follows:

$$\begin{cases} U\text{soft}(S, \tau)V^T = \underset{X}{\arg\min}\,\tau\|X\|_* + \frac{1}{2}\|X - Z\|_F^2 \\ \text{soft}(Z, \tau) = \underset{X}{\arg\min}\,\tau\|X\|_1 + \frac{1}{2}\|X - Z\|_F^2 \end{cases}$$

$USV^T$ is singular value decomposition of the matrix Z, for $\forall Z \in R^{m \times n}$, $U \in R^{m \times r}$, and $V \in R^{r \times n}$, r is the rank of the matrix, therefore, the optimization problem of the matrix A is transformed into $$A^{k+1} = U^k \text{soft}\left(P - E^k + \frac{Y^k}{\mu^k}, \frac{1}{\mu^k}\right)V^k,$$

and similarly, the optimization problem of the matrix E is transformed into $$E^{k+1} = \text{soft}\left(P - A^{K+1} + \frac{Y^k}{\mu^k}, \frac{\lambda}{\mu^k}\right).$$

Step 3.1.4: setting an iteration cut-off condition, wherein the cut-off condition is:

$$\frac{\|S \cdot (P - A_k - E_k)\|_F}{\|S \cdot P\|_F} < \varepsilon$$

S is the weight matrix, and the S weight matrix is used, so that the iteration time can be greatly shortened, and the detection speed can be increased.

Step 3.2: abnormal candidate region search in pipelines based on multi-data fusion.

Step 3.2.1: performing abnormal region research on uniaxial data respectively under the data reconstruction framework based on Lagrange multiplication to obtain triaxial abnormal regions $O_X$, $O_Y$, $O_Z$.

Step 3.2.2: establishing a triaxial fusion optimization framework:

$$\min(O_X \cup O_Y \cup O_Z), \text{ subject to } O_{Xi} \cup O_{Yj} \cup O_{Zk} \neq \emptyset$$

Step 3.2.3: eliminating overlapping by a non-maximum suppression algorithm while considering the diversity of generation of candidate regions, merging windows which are close with each other, and using the maximum outer boundary of two windows as the outer boundary of a new form, wherein the merging criterion is that: if the transverse center distance of adjacent windows is less than the minimum transverse length of the adjacent windows.

Step 3.3: anomaly identification of MFL in pipelines based on an evolvable model.

Step 3.3.1: extracting abnormal samples from a complete MFL data set, and establishing an anomaly identification model based on the convolutional neural network (CNN).

Step 3.3.2: for incorrectly-identified samples, adding new labels as new classification, going to Step 3.3.1, re-establishing the anomaly identification model, performing reclassification, and finding out the MFL signals with defects, wherein the quantization module adopts a defect quantization method based on a random forest to obtain the defect size, specifically comprising the following steps.

Step 4.1: collecting data; detecting the defect MFL signals, and extracting features of the MFL signals to obtain the feature values of the defect MFL signals, specifically as follows: finding out the peak-valley position and peak-valley value of an MFL signal of axial maximum channel according to the minimum point on the MFL signal of axial maximum channel; after judging and determining as single-peak and double-peak defects, extracting 10 waveform-related features, namely peak value of single-peak defect, Maximum peak-valley difference of single-peak defect, valley width of double-peak defect, left peak-valley difference and right peak-valley difference of double-peak defect signals, peak-to-peak distance of double-peak defect signals, axial spacing between special points, area feature, surface energy feature, defect volume, and defect body energy.

The 10 features are specifically described as follows:

A. peak value of single-peak defect: $Y_v$ is the defect minimum valley value, and $Y_{p\text{-}v}$ is the maximum peak-valley difference. Since the defect MFL signals are affected by various factors such as detection environments of the inner detection tool, the baseline of data fluctuates greatly. Taking the peak-valley difference of defect data as a feature quantity can eliminate the influence of the signal baseline well and improve the reliability of quantitative analysis of defects;

B. maximum peak-valley difference of single-peak defect: expression is: $Y_{p\text{-}v} = Y_p - Y_v$, wherein $Y_p$ is the peak value of single-peak defect, $Y_v$ is the minimum valley value of defects, and $Y_{p\text{-}v}$ is the maximum peak-valley difference. Since the defect MFL signals are affected by various factors such as detection environments of the inner detection tool, the baseline of data fluctuates greatly. Taking the peak-valley difference of defect data as a feature quantity can eliminate the influence of the signal baseline well and improve the reliability of quantitative analysis of defects;

C. valley width of double-peak defect: formulated as: $X_{v\text{-}v} = X_{vr} - X_{vl}$, wherein $X_{v\text{-}v}$ represents the valley width of an axial signal of defects, $X_{vr}$ is the right valley position of the defects, and $X_{vl}$ is the left valley position of the defects. The valley width of defect signals can reflect the axial distribution of the defect signals;

D. left peak-valley difference and right peak-valley difference of double-peak defect signals: formulated as: $Y_{lp\text{-}lv}=Y_{lp}-Y_{lv}$, $Y_{rp\text{-}rv}=Y_{rp}-Y_{rv}$, wherein $Y_{lv}$ is the left valley value of MFL signals, $Y_{rv}$ is the right valley value of the MFL signals, $Y_{lp}$ is the left peak value of double-peak signals, $Y_{rp}$ is the right peak value of the double-peak signals, $Y_{lp\text{-}lv}$ is the left peak-valley difference, and $Y_{rp\text{-}rv}$ is the right peak-valley difference;

E. peak-to-peak distance of double-peak defect signals: formulated as: $X_{p\text{-}p}=X_{pr}-X_{pl}$, wherein $X_{pr}$ is the right-peak position, $X_{pl}$ is the left-peak position, and $X_{p\text{-}p}$ is the peak-to-peak distance of signals. A combination of the peak-to-peak distance and the peak-valley value of defect signals can roughly determine the shape of an abnormal data curve, which is contribute to quantitative analysis of defect length and depth;

F. axial spacing between special points: in order to obtain the key feature quantity of defect length, the extraction method of special points comprises: setting the proportion m_RateA of rectification, and calculating the threshold according to $X+(Y-X)*m\_RateA$, wherein X is the mean value of valley values, Y is the maximum peak value, two points closest to the threshold in the MFL signal of axial maximum channel s are the special points, and the spacing between special points is the key feature quantity for obtaining the defect length;

G. area feature: A valley value with a lower value is taken as the baseline, the area covered between data curves of two valleys and the baseline is taken and formulated as:

$$S_a = \sum_{t=N_1}^{N_2} \{x(t) - \min[x(t)]\}$$

wherein $S_a$ represents the waveform area of defects; $x(t)$ represents the signal data point of defects; $\min[x(t)]$ represents the minimum valley value of defects; $N_1$ represents the left valley position of defects; $N_2$ represents the right valley position of defects;

H. surface energy feature: the energy of a data curve between two valleys is obtained and formulated as:

$$S_e = \sum_{t=N_1}^{N_2} \{x(t) - \min[x(t)]\}^2$$

wherein, $S_e$ is the defect waveform surface energy;

I. defect volume: the defect volume is obtained by summing the defect areas within a defect channel range, and formulated as:

$$V_a = \sum_{t=n_1}^{n_2} S_a(t)$$

wherein $V_a$ represents the defect volume; $n_1$ represents the starting channel determined by the position of a direction signal at a special point; $n_2$ represents the termination channel determined by the position of a circumferential signal at a special point; and $S_a(t)$ represents the single-channel axial defect area; and J. defect body energy: the defect body energy is obtained by summing the defect surface energy within the defect range, and formulated as:

$$V_e = \sum_{t=n_1}^{n_2} S_e(t)$$

wherein, $V_e$ represents the defect body energy; and $S_e(t)$ represents the surface energy of single-channel axial defect signals.

Step 4.2: using the feature value of the defect MFL signal as a sample; using the manually-measured defect size as a label, wherein the defect size includes the depth, width and length of a defect; manually selecting the initial training set and the testing set.

Step 4.3: training the network; inputting the training set into an initial random forest network.

Step 4.4: adjusting the network; inspecting the results of the random forest regression network through the testing set, and obtaining a final network by adjusting parameters.

Step 4.4.1: selecting me defect samples by a Bootstrapping method by random sampling with replacement from the $M_h \times N_h$ dimension of original MFL signal feature defect samples, with $m_e \leq M_h$, performing samplings for $T_c$ times in total, and generating $T_c$ training sets.

Step 4.4.2: for the $T_c$ training sets, training $T_c$ regression tree models, respectively.

Step 4.4.3: for a single regression tree model, selecting $n_e$ features from a MFL defect signal feature set, wherein $n_e \leq N$; then performing division each time based on the information gain ratio $$g_R(D, A) = \frac{g(D, A)}{H_A(D)},$$

wherein $H_A(D)$ in the formula represents the entropy of feature A, and $g(D, A)$ represents information gain; selecting the feature with the maximum information gain ratio for division; initially, setting the maximum feature number, max_features, of the parameters as None, that is, without limiting the feature number selected in the network.

Step 4.4.4: enabling every tree to keep division like this, in order to prevent overfitting in the process of division, pruning the regression tree through consideration of the complexity of the regression tree. Pruning is performed by minimizing the loss function $C_\alpha(T)=C(T)+\alpha|T|$, wherein $C(T)$ represents the model's prediction error for the defect size, namely, the degree of fitting. $|T|$ represents model complexity, and $\alpha$ is used to regulate the complexity of the regression tree. The prediction error of the loss function is taken as the value at POF 90% position by using the international POF standards for sea oil transportation.

Step 4.4.5: for model parameter tuning optimization, finding out the optimal parameters by CVGridSearch and K-fold cross-validation, wherein the optimal parameters comprise random forest framework parameter, out-of-bag sample evaluation score $e_{oob}$ and maximum number of iterations, as well as maximum feature number of tree model parameter, i.e. max_features, maximum depth, minimum number of samples required for inner node subdivision and minimum number of samples of leaf nodes.

Step 4.4.6: forming the random forest by a plurality of generated decision trees, for the regression problem network established from defect feature samples, the finally-predicted defect size is determined by the mean value of the predicted values of a plurality of trees.

Step 4.5: inputting the data to be tested in the testing set into the random forest network adjusted according to Step 4.4, and outputting the predicted defect size, wherein at this time, if the data to be tested is the depth in the defect size, the output size is the depth of the predicted defect size; if the data to be tested is the width in the defect size, the output size is the width of the predicted defect size; if the data to be tested is the length in the defect size, the output size is the length of the predicted defect size, wherein, predicted depth reflects the value at position 80% ranked by the absolute value of error according to the international POF standards for oil pipelines, the formula is: $POF_{80}=sort(|(y_c-\tilde{y}_c)|)\times 80\%$, wherein $y_c$ and $\tilde{y}_c$ are design depth and predicted depth, respectively.

The solution module adopts a pipeline solution improved based on the standard ASME B31G, imports the maintenance decision model and outputs the evaluation results, specifically comprising the following steps.

Step 5.1: extracting all defect length columns, depth columns and pipeline property parameters in defect information from a complete MFL data set, wherein the pipeline property parameters comprise minimum yield strength SMYS, minimum tensile strength SMTS, nominal outside diameter $D_d$, wall thickness $t_a$ and maximum allowable operating pressure MAOP.

Step 5.2: calculating the value $$S_{flow} = \frac{3SMYS + 0.4SMTS}{3}$$

of rheological stress, wherein SMYS is the minimum yield strength of the pipe in Mpa, and SMTS is the minimum tensile strength in Mpa.

Step 5.3: calculating the predicted failure pressure $$S_F = S_{flow} \times \frac{\left(1 - \frac{A_{area}}{A_{area0}}\right)}{\left(1 - \frac{A_{area}}{A_{area0}L_0}\right)}$$

of pipelines, when $z \leq 20$, the length expansion coefficient $$L_0 = \left(1 + \mu z + \beta z^2\right)^{\frac{1}{2}},$$

when $z>20$, the length expansion coefficient $$L_0 = (\eta z + \lambda_a), z = \frac{L^2}{D_d t_a},$$

the metal loss area $$A_{area} = \frac{2}{3}dL$$

in a corrosion area, and the original area $A_{area0}=t_a L$, wherein d is the defect depth in mm; $t_a$ is the pipeline wall thickness in mm; $D_d$ is the nominal outside diameter in mm.

Step 5.4: calculating the maximum failure pressure $$P_f = S_F \times \frac{2t_a}{D_d}$$

of the pipeline, reorganizing and getting:

$$P_f = \frac{2t_a}{D_d} \times S_{flow} \times \frac{\left(1 - \theta_a \frac{d}{t_a}\right)}{\left(1 - \theta_a \frac{d}{t_a L_0}\right)}$$

when $z \leq 20$, $\theta_a = \frac{2}{3}$, when $z>20$, $\theta_a=1$.

Step 5.5: calculating the maintenance index $$ERF = \frac{P}{P_f},$$

wherein $$P = \frac{2t_a}{D_d} \times SMYS,$$

P is the maximum allowable design pressure; if the maintenance index ERF is less than 1, it indicates that the defect is acceptable; if ERF is greater than or equal to 1, the defect is unacceptable, and then the pipe should be maintained or replaced.

Step 5.6: importing the maintenance decision model, conducting qualitative and quantitative analysis based on expert experiences and a life prediction model, then evaluating the severity of pipeline corrosion, formulating maintenance rules, and outputting the evaluation results according to the maintenance rules, comprising: maintenance index and maintenance recommendations; wherein rule 1: the maximum depth of wall thickness loss at the defect, which is greater than or equal to 80%, is considered as major corrosion, and maintenance is recommended: the pipe needs to be maintained or replaced immediately, rule 2: the ERF at the defect is greater than or equal to 1, which is considered as severe corrosion, maintenance is recommended: the pipe needs to be maintained immediately, rule 3: the ERF at the defect is greater than or equal to 0.95 and less than 1.0, which is considered as general corrosion, maintenance is recommended: the defect can be observed for 1-3 months, rule 4: the maximum depth at the defect is greater than or equal to 20% and less than 40%, which is considered as minor corrosion, maintenance is recommended: the defect can be observed regularly without treatment.

The intelligent analysis system has the following beneficial technical effects:

1. Compared with a general baseline correction algorithm, the complete data set building module proposes a secondary baseline correction algorithm, and the method reduces the influence of abnormal data on the overall base value and improves the accuracy of baseline correction. Also, the algorithm of adding logical regression in each KNN box is adopted to realize the interpolation of missing data. The method is applicable in different types of data missing, and has a powerful anti-interference ability against the uncertainty of actual engineering data;

2. In the discovery module, a selective search algorithm is introduced to generate candidate regions, which is different from the general weld detection method, so that the speed and the accuracy of generating the candidate regions are increased; the candidate regions are classified using a convolutional neural network (CNN) algorithm, so that the robustness of the weld detection algorithm to signal noise is increased, and the classification accuracy is improved;

3. In the discovery module, multi-source MFL data is adopted for reconstruction, anomaly detection is realized by analyzing the deviation between reconstructed data and source data, and a novel weight matrix is applied in condition calculations so as to increase the algorithm speed. The experimental results show that the method is good in effects of anomaly detection;

4. In the quantization module, different from a general feature extraction method, according to the characteristic of instable sudden changes in MFL signals, the invention proposes a feature extraction method based on MFL signal waveform and statistics, so that the model identification effect is enhanced; an iterative loss function of the random forest is customized by using POF standards for offshore oil pipelines, making the algorithm highly adaptable in the field and highly accurate in defect quantization results. The method disclosed by the invention has been applied to the practical inversion of engineering pipelines, having a good effect of defect size quantification;

5. In the solution module, the invention is based on practical engineering applications. Compared with an original ASME B31G method, the method improves the calculation of rheological stress, thereby increasing the failure pressure and reducing the conservatism, but ASME B31G has too high conservatism, so that the high conservatism of ASME B31G does not cause a large amount of maintenance costs due to frequent maintenance; and 6. The invention proposes an intelligent analysis system and method for detecting MFL data in pipelines. Compared with the general analysis method of MFL data, the invention proposes an intelligent analysis process for detecting MFL data in pipelines from the overall perspective. The process sequence comprises a complete data set building module, a discovery module, a quantization module and a solution module. The process realizes the preprocessing of original MFL data detected in pipelines, detection of connecting components and anomaly detection which comprises: detection of defects, valves, meters and metal increment, defect size inversion and final maintenance decision.

BRIEF DESCRIPTION OF THE DRAWINGS

FIGS. 8a and 8b are a schematic diagram of data before and after baseline correction in the embodiment of the invention, wherein FIG. 8a is a schematic diagram of data before baseline correction, and FIG. 8b is a schematic diagram of data after baseline correction;

FIGS. 9a and 9b are a schematic diagram of complete data sets obtained before and after interpolation by the KNN-softmax algorithm in the embodiment of the invention, wherein FIG. 9a is a schematic diagram of the complete data set without interpolation, and FIG. 9b is a schematic diagram of the complete data set obtained after interpolation by the KNN-softmax algorithm;

DETAILED DESCRIPTION OF THE PREFERRED EMBODIMENT

The invention will be further described below in combination with the drawings and embodiments.

The invention provides an intelligent analysis software system for inner detecting MFL data in pipelines, proposes an analysis system for inner detecting MFL data from the overall perspective of non-destructive testing evaluation, and invents a complete data set building method based on time-domain-like sparse sampling and KNN-softmax from the perspective of intelligence, a pipeline connecting component discovery method based on a combination of a selective search and a convolutional neural network (CNN), an abnormal candidate region search and identification method based on a Lagrange multiplication framework and multi-source MFL data fusion, a defect quantization method based on a random forest and a pipeline solution improved based on standard ASME B31G. The safe operation and maintenance of pipelines are realized.

Figure 2:
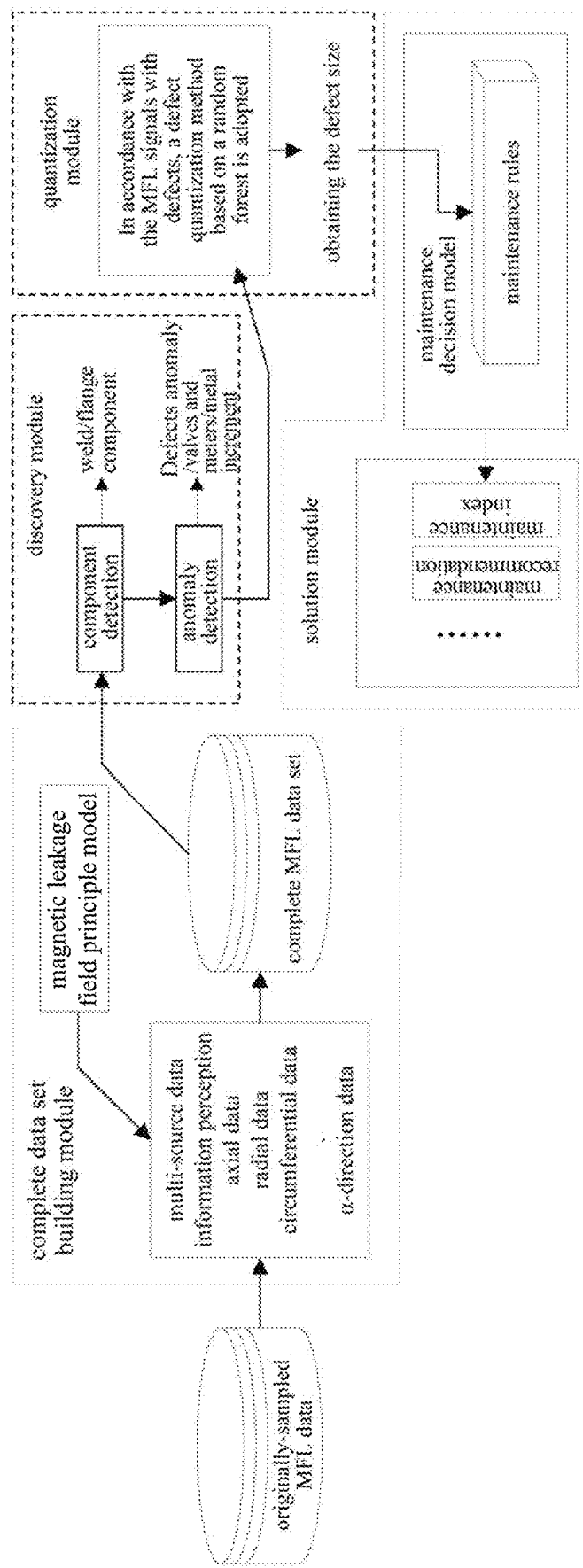
FIG. 2 is a block diagram of an intelligent analysis system for inner detecting MFL data in pipelines in the embodiment of the invention.

The block diagram of the intelligent analysis software system of MFL data of the invention is as shown in FIG. 2, and the whole system comprises 4 modules: a complete data set building module, a discovery module, a quantification module and a solution module, wherein the complete data set building module realizes anomaly detection and reconstruction of data and builds complete data sets; the discovery module comprises component detection and anomaly detection, and mainly aims to identify defects; the quantization module realizes the mapping from signals to physical properties, and obtains the length, width and depth of a defect;

and the solution module integrates defect detection, size inversion results, pipeline properties and historical data knowledge models, and finally gives a maintenance strategy.

Figure 1:
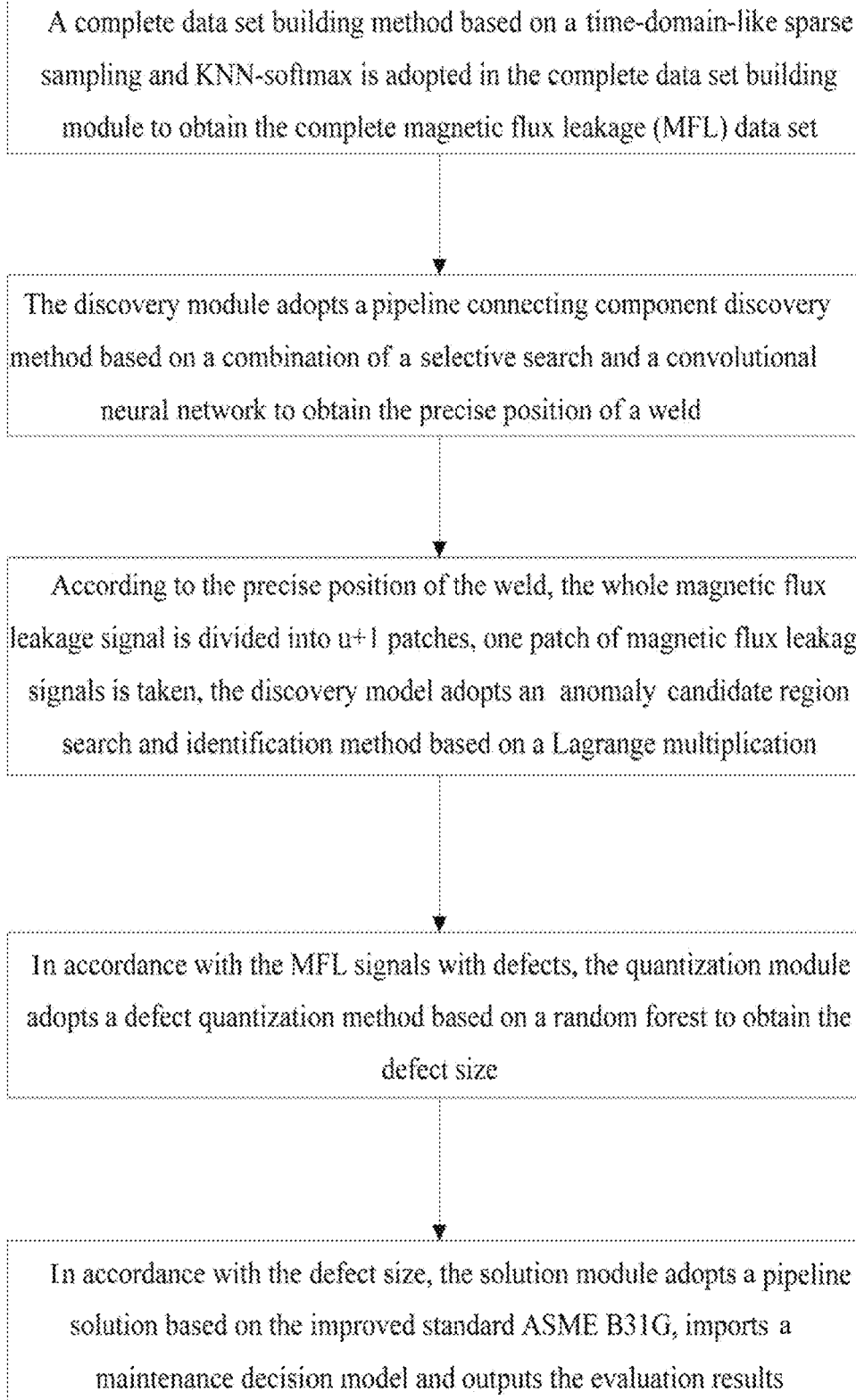
FIG. 1 is a flow chart of the operation process of an intelligent analysis system for inner detecting MFL data in pipelines in the embodiment of the invention.

The intelligent analysis system for inner detecting MFL data in pipelines proposed by the invention, as shown in FIG. 1, is specifically implemented as follows: a complete data set building method based on time-domain-like sparse sampling and KNN-softmax is adopted in the complete data set building module to obtain the complete MFL data set.

Figure 3A:
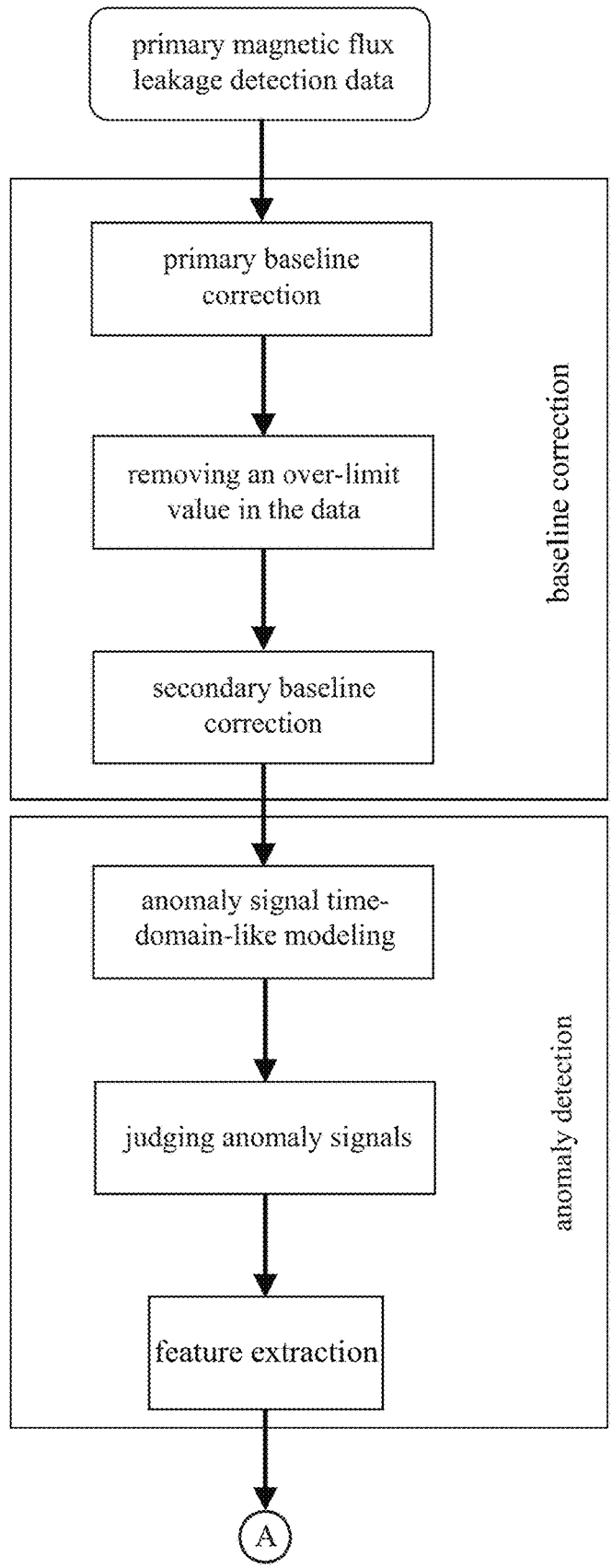
FIGS. 3a and 3b are a flow chart of the complete data set building method based on time-domain-like sparse sampling and KNN-softmax in the embodiment of the invention.
Figure 3B:
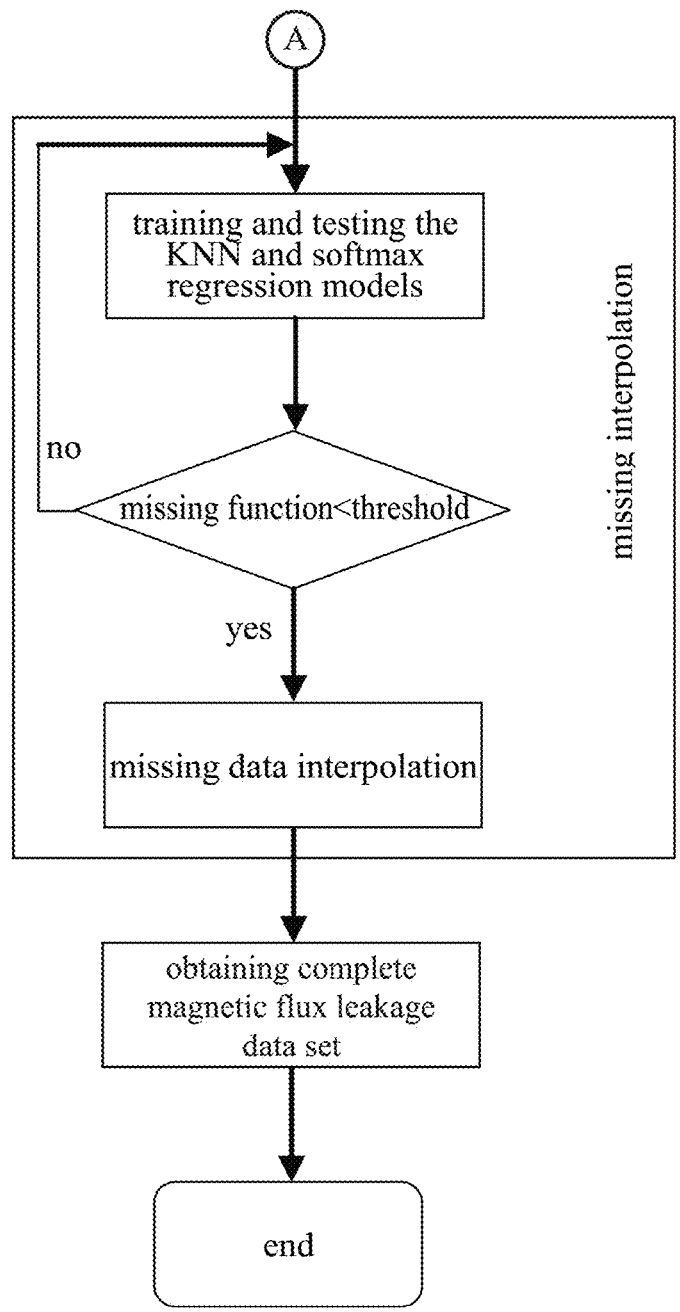

The flow chart of data preprocessing based on time-domain-like sparse sampling and KNN-softmax is as shown in FIGS. 3a and 3b. Firstly, baseline corrections are performed twice on data, then time-domain-like modelling and anomaly identification are performed on data. Finally, for the data anomaly part, a KNN-softmax regression model is applied for data interpolation, and the complete MFL data set is finally built. The specific steps of data preprocessing based on time-domain-like sparse sampling and KNN-softmax are as follows.

Step 1.1: collecting the original MFL detection data directly from a MFL detection tool of submarine pipelines, and performing secondary baseline correction on data, wherein the originally-sampled MFL data is used as multi-source data information, specifically comprising: axial data, radial data, circumferential data and α-direction data.

Step 1.1.1: performing primary baseline correction on the original MFL detection data, which is expressed as:

$$x'_{i_a j_a} = x_{i_a j_a} - \frac{1}{k_c}\sum_{i_a=1}^{k_c} x_{i_a j_a} + s (j_a = 1, 2, \ldots, n_a)$$

wherein, $k_c$ is the number of mileage count points; $x_{i_a j_a}$ is the original value of channel $j_a$ in the position of mileage count point $i_a$; $x'_{i_a j_a}$ is the corrected value of channel $j_a$ in the position of mileage count point $i_a$; s is the median value of all channels, and $n_a$ is the number of channels of the MFL inner detection tool.

Step 1.1.2: removing an over-limit value $\pm T_a$ in the data, and assigning the position value of the over-limit value to the median value s of all channels, which is expressed as:

$$x'_{i_a j_a} = s, \text{ if } x'_{i_a j_a} > |T_a|$$

Step 1.1.3: performing secondary baseline correction on data with the over-limit value removed:

$$x''_{i_a j_a} = x'_{i_a j_a} - \frac{1}{k_c}\sum_{i_a=1}^{k_c} x'_{i_a j_a} + s' (j_a = 1, 2, \ldots, n_a)$$

wherein, $k_c$ is the number of mileage count points; $x'_{i_a j_a}$ is the primary correction value of channel $j_a$ in the position of mileage count point $i_a$; $x''_{i_a j_a}$ is the value of channel $j_a$ in the position of the mileage count point $i_a$ after secondary correction; s' is the median value of all channels after primary correction.

Step 1.2: performing time-domain-like sparse sampling anomaly detection treatment on data after secondary baseline correction.

Step 1.2.1: performing abnormal signal time-domain-like modeling on data after secondary baseline correction, namely corresponding the sampling points to time information.

Step 1.2.1.1: performing mathematical modeling on anomaly parts, wherein the modeling result is represented as:

$$f(t)' = p(t)' * \sin(2\pi n f t)$$

wherein $$p(t)' = \begin{cases} 1, t \in [0, t_1] \cup [t_2, 0.2] \\ a, t \in (t_1, t_2) \end{cases}$$

wherein p(t)' represents a voltage swell compensating signal of MFL detection in pipelines, f represents a signal sampling rate, t represents sampling time, $t_1$, $t_2$ represents sampling intervals, a represents power pipelines, n is a system fluctuation amplitude coefficient, and f(t)' is voltage waveform change frequency.

Step 1.2.1.2: setting the variation of abnormal data of MFL detection by using the range as a collection unit, regarding the variance of pipeline system voltage data collected in each range as the data variation by using $k_e=100$ collected data as a range, and judging the degree of voltage signal fluctuation of MFL data. The specific calculation method comprises the steps:

$$\Delta f_0^2 = \sum_{i=1}^{k_e}(f_i - \bar{f})^2 / k_e$$

namely $$\Delta f_0 = \sqrt{\sum_{i_c=1}^{k_e}(f_{i_c} - \bar{f})^2 / k_e}$$

wherein $f_{i_c}$ represents sampling point $i_c$ within a given range, $\bar{f}$ represents the mean value of pipeline system voltage data collected in the range, and $\Delta f_0$ represents the degree of voltage signal fluctuation of MFL data.

Step 1.2.1.3: calculating the voltage state variation $\Delta f_{i_c}$, wherein the formula is as follows:

$$\Delta f_{i_c} = \sqrt{\sum_{i_c=2}^{k_e}(f_{i_c} - f_1)^2 / (k_e - 1)}$$

Step 1.2.2: judging abnormal signals, if $\Delta f_{i_c} > 3*\Delta f_0$, regarding data at this time as an anomaly generated by external disturbance, which is an anomaly part.

Step 1.2.3: manually extracting the training sample features $T=(X_1, X_2, \ldots X_7, X_8)$, wherein a total of 8 features are extracted, which are left valley value, right valley value, valley width value, peak value, left peak-valley difference, right peak-valley difference, differential left peak value and differential right peak value.

Manually extracting the testing sample features $T'=(X'_1, X'_2, \ldots, X'_7, X'_8)$, wherein a total of 8 features are extracted, which are left valley value, right valley value, valley width, peak value, left peak-valley difference, right peak-valley difference, differential left peak value and differential right peak value.

Manually extracting the features $T''=(X''_1, X''_2, \ldots, X''_7, X''_8)$ of data to be interpolated, wherein a total of 8 features are extracted, which are left valley value, right valley value, valley width, peak value, left peak-valley difference, right peak-valley difference, differential left peak value and differential right peak value.

Step 1.3: performing missing interpolation treatment based on KNN-logistic regression on the MFL data of submarine pipelines.

Step 1.3.1: training and testing the KNN and softmax regression models.

Step 1.3.1.1: dividing the feature sample data T into two parts, wherein one part of the feature sample data $X_{Train}$ is used for training the KNN model, and the other part of the feature sample data $T_{Test}$ is used for testing the KNN model.

Step 1.3.1.2: inputting $X_{Train}$ into the KNN model, setting the initial value of K to 5, and training the KNN model.

Step 1.3.1.3: inputting $T_{Test}$ into the trained KNN model for classification, calculating the discrimination error rate, if the error rate is less than a threshold, changing the training and testing samples by a V-fold cross-validation method, and continuing performing training; else, making K=K+1, continuing training the model, and stopping training when K is greater than the threshold M.

Step 1.3.1.4: (for the feature sample data $T_{i_d}$ ($i_d$=1, ..., 4) assigned to each category, the data set corresponding to the feature sample is $D_{i_d}$ ($i_d$=1, ..., 4)) normalizing $T_{i_d}$ ($i_d$=1, ..., 4) and $D_{i_d}$ ($i_d$=1, ..., 4) respectively to obtain $T'_{i_d}$ ($i_d$=1, ..., 4) and $D'_{i_d}$ ($i_d$=1, ..., 4), expressed as:

$$T'_{i_d} = \frac{T_{i_d} - \overline{T_{i_d}}}{\max(T_{i_d}) - \min(T_{i_d})}, D'_{i_d} = \frac{D_{i_d} - \overline{D_{i_d}}}{\max(D_{i_d}) - \min(D_{i_d})}$$

$\overline{T_{i_d}}$ is the mean value of feature sample data; $\overline{D_{i_d}}$ is the mean value of data corresponding to feature samples.

Step 1.3.1.5: adding a softmax regression model at a node of each class, wherein a hypothesis function is expressed in the formula:

$$h_\theta(x^{i_e}) = \begin{pmatrix} p(y^{(i_e)} = 1 \mid x^{(i_e)}; \theta) \\ p(y^{(i_e)} = 2 \mid x^{(i_e)}; \theta) \\ M \\ p(y^{(i_e)} = k_f \mid x^{(i_e)}; \theta) \end{pmatrix}$$

wherein, x is the sample input value, y is the sample output value, $\theta$ is the training model parameter, $k_f$ is the vector dimension, $i_e$ is category $i_e$ in the classification and $p(y=i_e|x)$ represents the estimated probability value for category $i_e$.

Step 1.3.1.6: inputting the training sample set $D'_{i_d}$ at each node into the softmax regression model to obtain the output value $y^{(I_e)}$ after interpolation, wherein the loss function $J(\theta)$ is:

$$J(\theta) = -\frac{1}{m_d}\left[\sum_{i_e=1}^{m_d}\sum_{j_e=1}^{k_f} 1\{y^{(i_e)} = j_e\}\log\frac{e^{\theta_{j_e}^T x^{(i_e)}}}{\sum_{l=1}^{k_f} e^{\theta_{j_e}^T x^{(i_e)}}}\right]$$

x is the sample input value; y is the sample output value; $\theta$ is the training model parameter; $k_f$ is the vector dimension; $i_e$ is category $i_e$ in the classification; $j_e$ is sample input $j_e$ in the classification; $m_d$ is the number of samples; 1{•} is the indicative function, and if value in braces is the true value, the expression value is 1.

Step 1.3.2: calculating the loss function of the predicted result, and setting the threshold P to be 0.5, if $J(\theta)>P$, returning to Step 1.3.2.2, making K=K+1, and continuing training the model until $J(\theta)\leq P$, when K is greater than the threshold M, stopping training, and outputting the output value $y^{(i)}$ after interpolation.

Step 1.3.3: inputting the data features and data sets to be interpolated into the trained model to realize interpolation of missing data so as to obtain the complete MFL data set, wherein because the originally-sampled MFL data is used as the multi-source data information, a complete multi-source MFL data set is obtained.

Figure 8B:
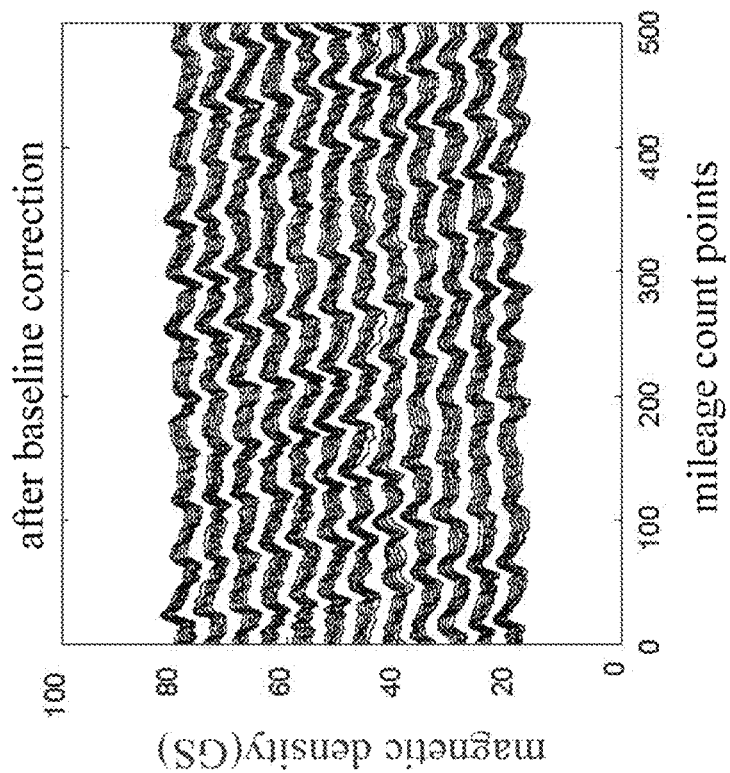
Figure 8A:
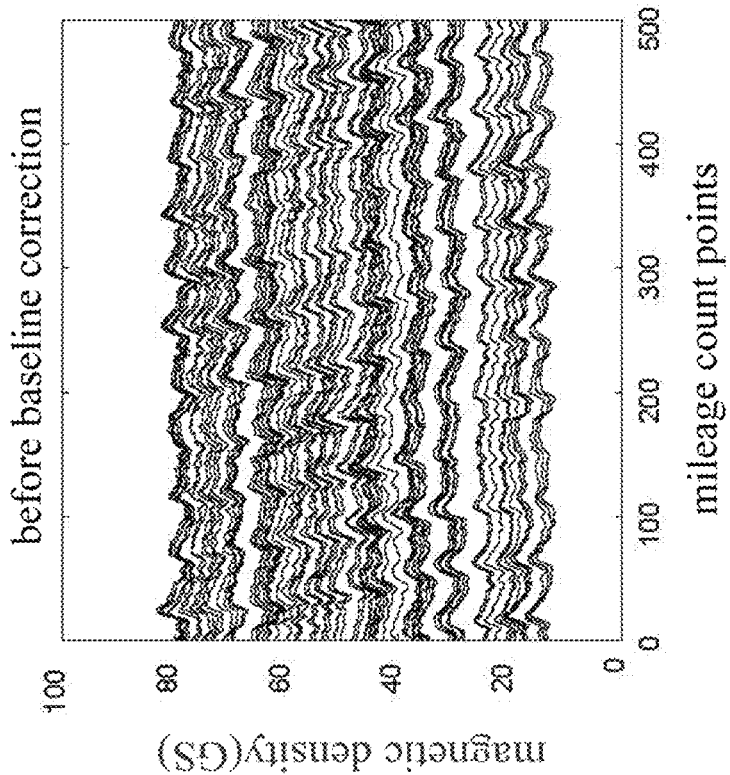

Simulation results of Step 1: FIG. 8a is the schematic diagram of data before baseline correction. It can be seen from FIG. 8a that the data base values without baseline correction are high in difference, and the data distribution of each channel is uneven after an offset is added; FIG. 8b is the schematic diagram of data after baseline correction. It can be seen from FIG. 8b that the data base values after baseline correction are equal, and the data distribution of each channel is even after the offset is added, thereby reducing the error of subsequent data processing.

Figures 9A, 9B:
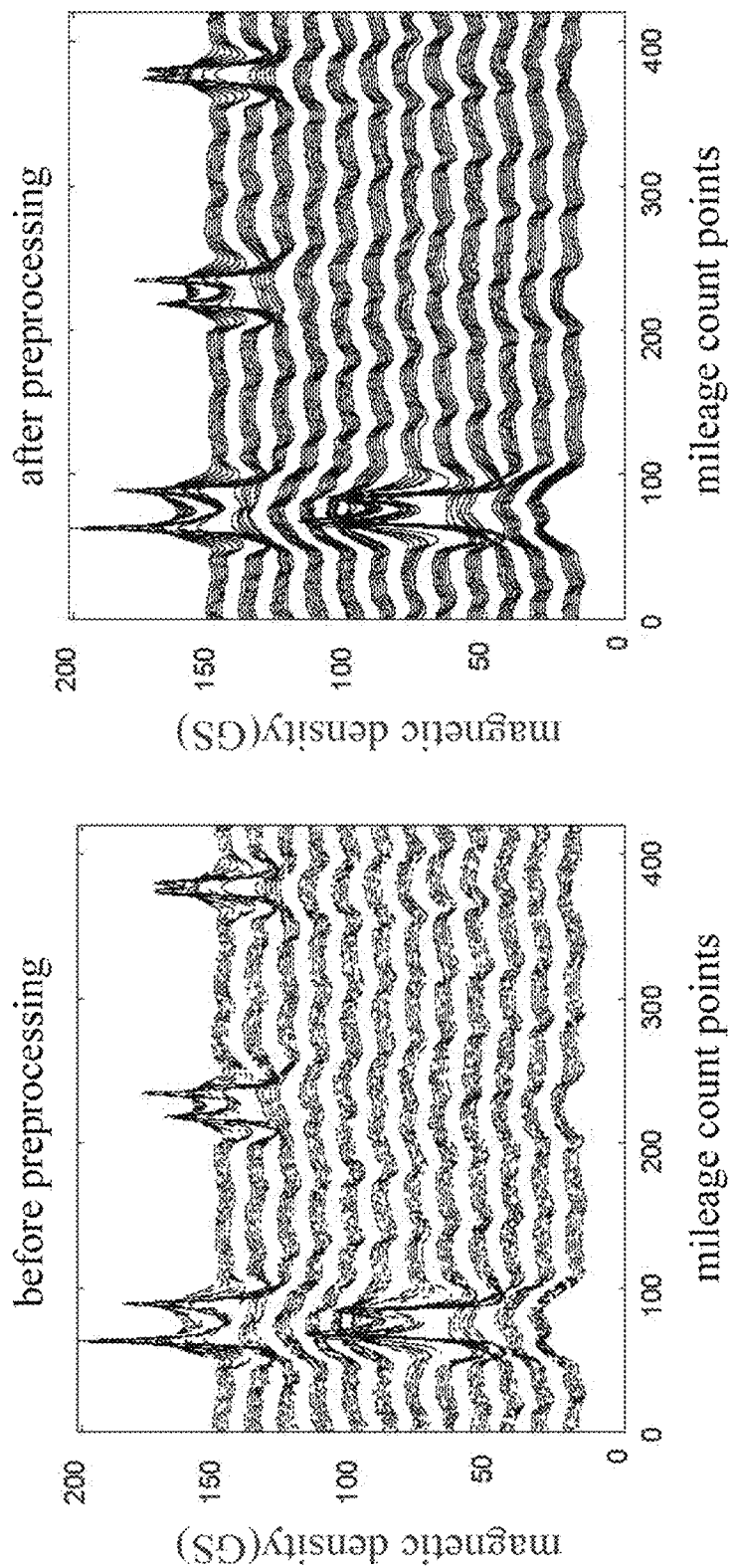

FIG. 9a is the schematic diagram containing missing data sets without data interpolation, and FIG. 9b is the schematic diagram of the complete data set obtained after interpolation by the KNN-softmax algorithm. According to FIG. 9b, the algorithm can complete interpolation of missing data no matter in a defect position or in a smooth position.

Figure 4:
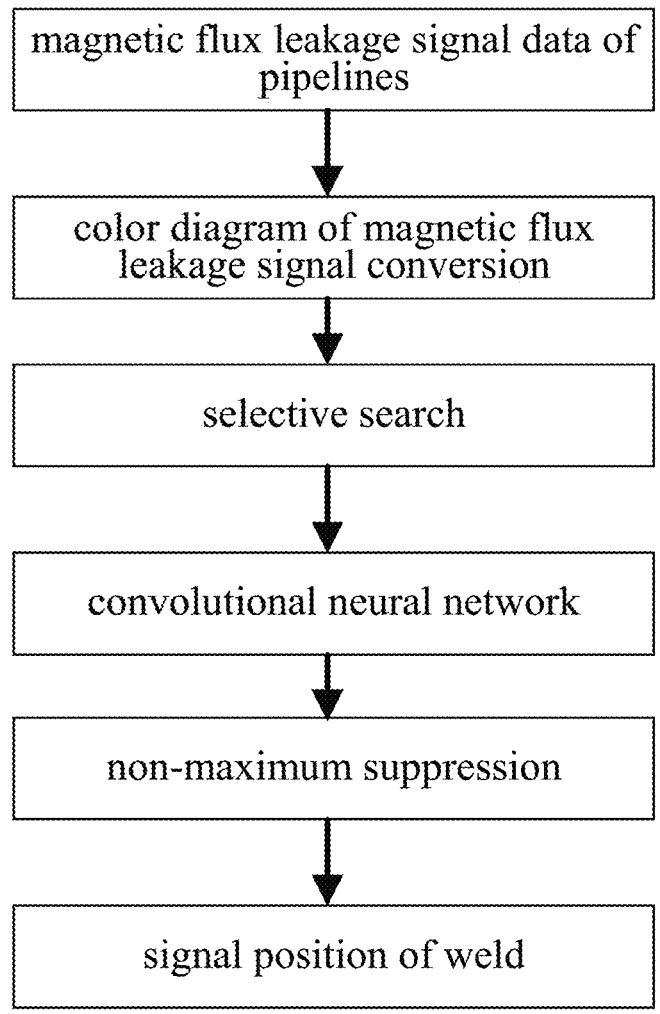
FIG. 4 is a flow chart of the pipeline connecting component discovery method based on a combination of a selective search and a convolutional neural network (CNN) in the embodiment of the invention.

The discovery module adopts the pipeline connecting component discovery method based on a combination of a selective search and a convolutional neural network (CNN) to obtain the precise position of a weld, specifically comprising the following steps that a detection flow of pipeline connecting components based on the combination of the selective search and the convolutional neural network (CNN) of the invention is as shown in FIG. 4. Firstly, MFL signals are converted into a color diagram, then candidate regions are obtained by selective search and identified by a convolutional neural network (CNN), finally region overlapping is removed by a non-maximum suppression method, and a final component position is obtained. The specific steps are as follows.

Step 2.1: extracting the MFL signal data of a pipeline: from a complete MFL data set, dividing a whole MFL signal matrix D into $n_g$ patches of the pipeline MFL signal matrix $D_1, D_2, \ldots, D_{n_g}$ in an equal proportion, wherein each divided MFL signal matrix consists of $M_{n_g} \times N_{n_g}$ data, wherein the whole MFL signal matrix D which is M×N in size is obtained after collection by the MFL inner detection tool. The matrix is divided into MFL signal matrices $D_1, D_2, \ldots, D_{10}$ which are $M_1 \times N, M_2 \times N, \ldots M_{10} \times N$ in size in an equal proportion, wherein $M_1 = M_2 = \ldots = M_{10}$, $M_1 + M_2 + \ldots + M_{10} = M$.

Step 2.2: color diagram of MFL signal conversion: setting the upper limit $A_{top}$ of a signal amplitude and the lower limit $A_{floor}$ of the signal amplitude, and converting the pipeline MFL signal matrices $D_1, D_2, \ldots, D_{n_g}$ into pipeline color diagram matrices $C_1, C_2, \ldots, C_{n_g}$ accordingly.

Step 2.2.1: setting the upper limit $A_{top}$ of the signal amplitude and the lower limit $A_{floor}$ of the signal amplitude.

Step 2.2.2: converting the pipeline MFL signal matrices $D_1, D_2, \ldots, D_{n_g}$ into gray matrices $Gray_1, Gray_2, \ldots, Gray_{n_g}$ between 0 and 255 according to the following formula, $$\begin{cases} gray_{ij} = 255, d_{ij} > A_{top} \\ gray_{ij} = \dfrac{255g(d_{ij} - A_{floor})}{A_{top} - A_{floor}}, A_{floor} < d_{ij} \le A_{top} \\ gray_{ij} = 0, d_{ij} \le A_{floor} \end{cases}$$

wherein $i \in M_{n_g}$, $j \in N_{n_g}$; $d_{ij}$ is a component element of the MFL signal matrix D, and $gray_{ij}$ is a component element of the gray matrix Gray.

Step 2.2.3: converting the gray matrices $Gray_1$, $Gray_2, \ldots, Gray_{n_g}$ into 3D color matrices $C_1, C_2, \ldots, C_{n_g}$ containing $R_1, R_2, \ldots, R_{n_g}, G_1, G_2, \ldots, G_{n_g}$ and $B_1, B_2, \ldots, B_{n_g}$ according to the following formula, $$r_{ij} = 0; g_{ij} = 4gray_{ij}; b_{ij} = c \cdot gray_{ij} \le c/4$$

$$r_{ij} = 0; g_{ij} = c; b_{ij} = -4gray_{ij} + 2c \cdot c/4 \le gray_{ij} \le c/2$$

$$r_{ij} = 4U_{ij} - 2c; g_{ij} = c; b_{ij} = 0 \cdot c/2 \le gray_{ij} \le 3c/4$$

$$r_{ij} = c; g_{ij} = -4gray_{ij} + 4c; b_{ij} = 0 \cdot gray_{ij} > 3c/4$$

wherein c=255, $r_{ij}$ is a component element of matrix R; $g_{ij}$ is a component element of matrix G; $b_{ij}$ is a component element of matrix B.

Step 2.3: selective search: for the color diagram $C_k$ of each segment of pipeline, extracting $m_c$ candidate regions $r_{k1}, r_{k2}, \ldots r_{km_c}$ by selective search.

Step 2.3.1: for the color diagram $C_k$ of each segment of pipeline, using a division method to obtain a candidate region set $R_k = \{r_{k1}, r_{k2}, \ldots, r_{kw}\}$.

Step 2.3.2: initializing a similarity set Sim=$\phi$.

Step 2.3.3: calculating the similarities sim$\{r_{ka}, r_{kb}\}$ of all adjacent regions $r_{ka}, r_{kb}$ according to the following formula.

$$sim(r_{ka}, r_{kb}) = \sum_{K=1}^{N} \min(c_{ka}^K, c_{kb}^K)$$

Step 2.3.4: repeating Step 2.3.3 until the similarities of all adjacent regions are calculated, and updating the similarity set Sim according to the following formula:

Sim=Sim$\cup$sim$(r_{ka}, r_{kb})$

Step 2.3.5: finding the maximum similarity sim$\{r_{kc}, r_{kd}\}$=max(Sim) from Sim, and obtaining a merged region $r_{ke} = r_{kc} \cup r_{kd}$ accordingly; removing sim$\{r_{kc}, r_{kd}\}$ from Sim.

Step 2.3.6: repeating Step 2.3.5 until Sim is empty so as to obtain mc merged regions $r_{k1}, r_{k2}, \ldots r_{km_c}$, wherein these regions are the candidate regions.

Step 2.4: convolution neural network: candidate region identification.

Step 2.4.1: building a convolutional neural network (CNN) with input of 72×72, and an intermediate layer of the convolutional neural network (CNN) comprises 4 convolutional layers, 4 down-sampling layers and 1 fully connected layer, wherein each convolutional layer is followed by a down-sampling layer used to evaluate local weighted mean as secondary feature extraction.

Step 2.4.2: extracting weld color diagrams of P $N_1 \times N_1$ from historical data as samples of the convolutional neural network (CNN), wherein 80% of random samples are used as training samples, and the remaining 20% are used as testing samples.

Step 2.4.3: repeatedly training the network for 500 times, wherein the one with the highest success rate of testing is used as the final network Net.

Step 2.4.4: inputting the candidate regions $r_{k1}, r_{k2}, \ldots r_{km}$ into the trained convolutional neural network (CNN) respectively for discrimination, for the region which is judged to be the weld, recording the position Loc and the network score Soc of the region, and finally, obtaining w positions $Loc_1, Loc_2, \ldots, Loc_w$ and scores $Soc_1, Soc_2, \ldots, Soc_w$.

Figure 10:
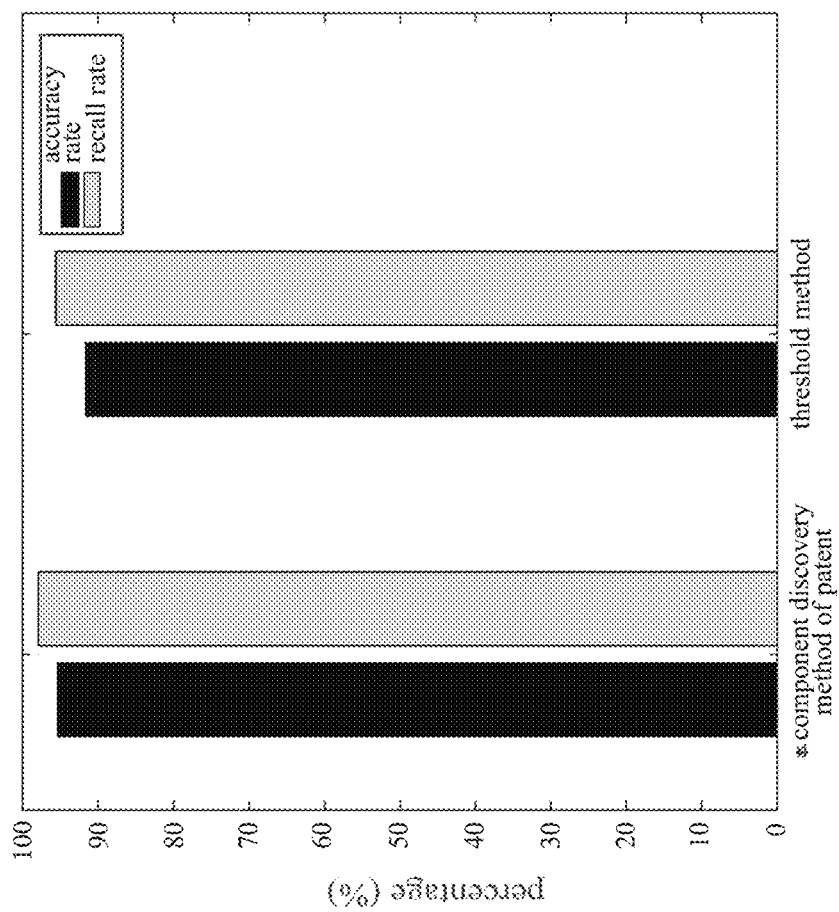
FIG. 10 is a schematic diagram of simulation results of the pipeline connecting component discovery method in the embodiment of the invention.

Step 2.5: Non-maximum suppression: obtaining the precise position $L_1, L_2, \ldots, L_u$ of the weld according to the position $Loc_1, Loc_2, \ldots, Loc_w$ and the score $Soc_1, Soc_2, \ldots, Soc_w$ of the weld seam based on the non-maximum suppression algorithm, wherein simulation results of Step 2 are as shown in FIG. 10: compared with a traditional method using thresholds, the accuracy rate is 91.5% and the recall rate is 95.51%, the pipeline component discovery method proposed by the invention has an accuracy rate of 95.3% and a recall rate of 97.94%; it can be seen that the method proposed by the invention has better performance.

Figure 6:
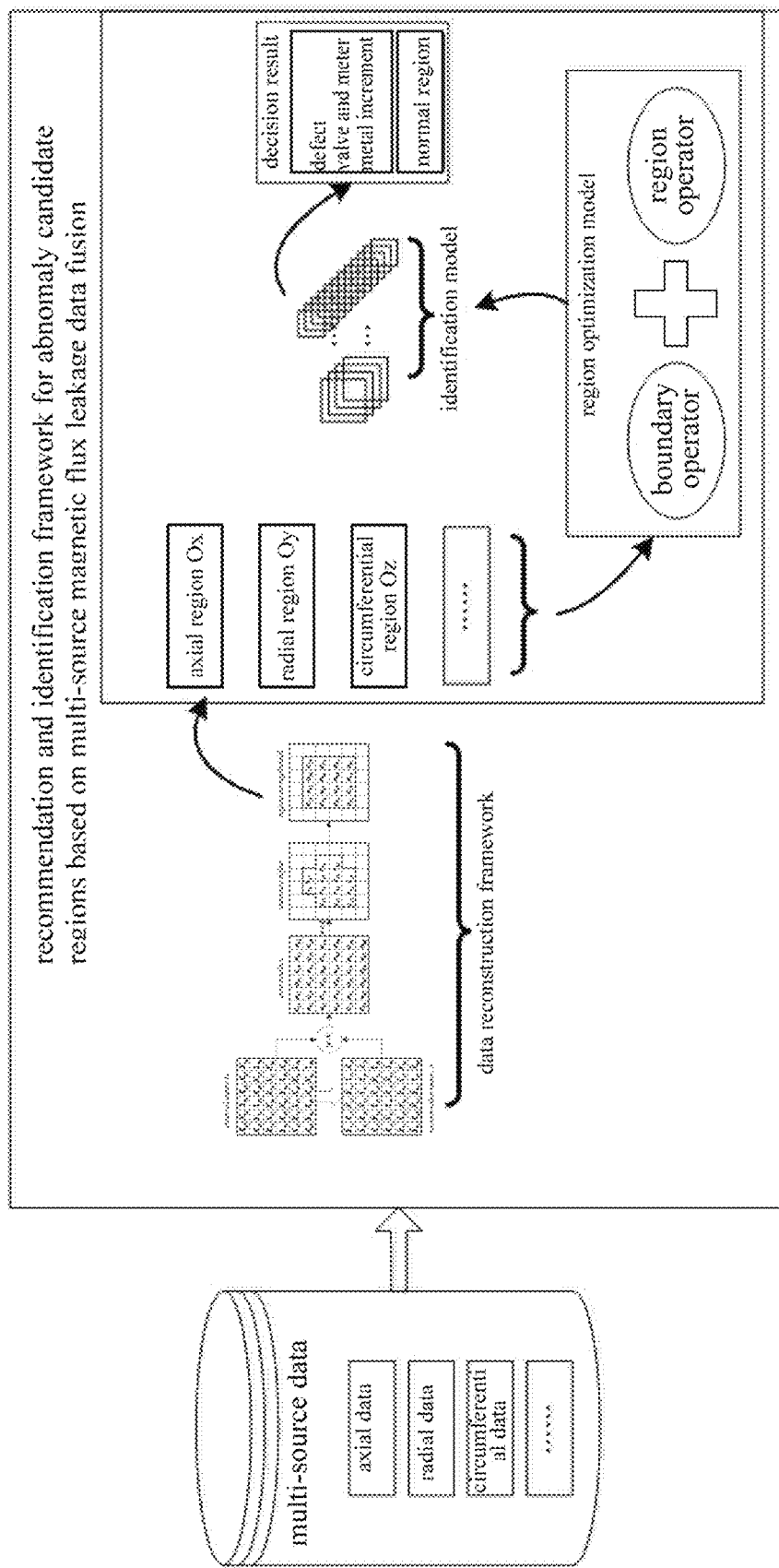
FIG. 6 is a schematic diagram of a recommendation and identification framework for abnormal candidate regions based on multi-source MFL data fusion in the embodiment of the invention.

According to the precise position of the weld, the whole MFL signals are divided into u+1 patches, one patch of MFL signals is taken, the discovery module adopts an abnormal candidate region search and identification method based on a Lagrange multiplication framework and multi-source MFL data fusion to find out MFL signals with defects, as shown in FIG. 6, specifically comprising the following steps.

Figure 5:
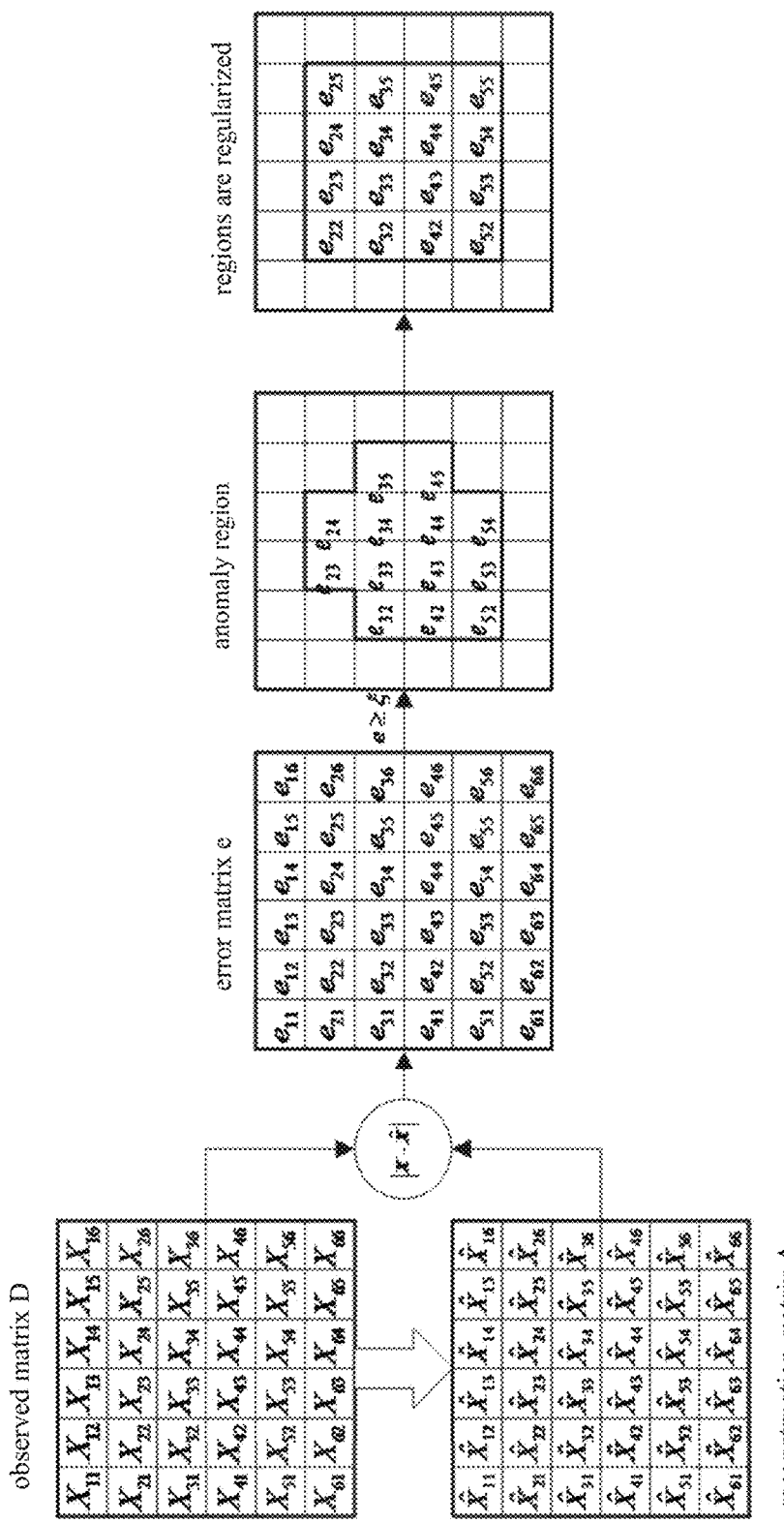
FIG. 5 is a schematic diagram of abnormal region search based on Lagrange multiplication in the embodiment of the invention.

Step 3.1: establishing a data reconstruction framework based on Lagrange multiplication, wherein the search flow of abnormal regions based on Lagrange multiplication of the invention is as shown in FIG. 5; a constrained optimization model is changed into an unconstrained optimization model through the Lagrange multiplication algorithm; finally, a reconstruction matrix is obtained by alternating iteration so as to obtain an error matrix of the reconstruction matrix and an observed matrix; abnormal regions are obtained through an appropriate threshold, and finally the regions are regularized; the specific steps are as follows.

Step 3.1.1: establishing a data reconstruction model:

$$\min_{A,E} \|A\|_* + \lambda \|E\|_1, \text{ subject to } D = A + E$$

Step 3.1.2: changing a constrained optimization model into an unconstrained optimization model, $$l(A, E, Y, \mu) = \|A\|_* + \lambda \|E\|_1 + \langle Y, D - A - E \rangle + \frac{\mu}{2} \|D - A - E\|_F^2$$

wherein the unconstrained model minimization problem can be solved through an iterative process as follows:

$$\begin{cases} A^{k+1} = \underset{A}{\arg\min}\, l(A, E, Y), & (unchanged E) \\ E^{k+1} = \underset{E}{\arg\min}\, l(A, E, Y), & (unchanged A) \\ Y^{k+1} = Y^k + \mu(D - A^{k+1} - E^{k+1}) \\ \mu^{k+1} = \rho \mu^k \end{cases}$$

Step 3.1.3: iterative optimization, wherein the optimization model of matrix A is:

$$A^{k+1} = \underset{A}{\arg\min} \|A\|_* + \langle Y, D - A - E^k \rangle + \frac{\mu^k}{2} \|D - A - E^k\|_F^2$$

-continued $$= \underset{A}{\operatorname{argmin}} \|A\|_* + \frac{\mu^k}{2} \left\| A - \left( D - E^k + \frac{Y^k}{\mu^k} \right) \right\|_F^2$$

for the convenience of calculation, the nuclear norm minimization problem can be solved by a soft threshold operator, the calculation formula of the soft threshold is $(x, \tau) = \operatorname{sgn}(x)(|x|-\tau)_+$, wherein $y_+ = \max(y,0)$, the operator can be used in the optimization process as follows:

$$\begin{cases} U soft(S, \tau) V^T = \underset{X}{\operatorname{argmin}} \tau \|X\|_* + \frac{1}{2} \|X - Z\|_F^2 \\ soft(X, \tau) = \underset{X}{\operatorname{argmin}} \tau \|X\|_1 + \frac{1}{2} \|X - Z\|_F^2 \end{cases}$$

therefore, the optimization problem of the matrix A is transformed into $$A^{k-1} = U^k \operatorname{soft}\left( D - E^\kappa + \frac{Y^k}{\mu^k}, \frac{1}{\mu^k} \right) V^k,$$

and similarly, the optimization problem of the matrix E is transformed into $$E^{k+1} = \operatorname{soft}\left( D - A^{K+1} + \frac{Y^k}{\mu^k}, \frac{\lambda}{\mu^k} \right).$$

Step 3.1.4: setting an iteration cut-off condition, wherein the cut-off condition is $$\frac{\|S \cdot (D - A_k - E_k)\|_F}{\|S \cdot D\|_F} < \varepsilon,$$

wherein S is the weight matrix, and the application of the S weight matrix can greatly reduce the iteration time, so that the detection speed can be increased; the matrix S of the invention is set as follows:

$$S = (s(i, j)) = \begin{cases} 0, & (D(i, j) \geq \bar{D}) \\ 1, & \text{else} \end{cases}$$

Step 3.2: abnormal candidate region search in pipelines based on multi-data fusion, wherein the recommendation and identification framework for abnormal candidate regions based on multi-source MFL data fusion is as shown in FIG. 6; performing recommendation of abnormal regions on multi-source data respectively under the above data reconstruction framework; then performing optimizing from the perspectives of boundary and region through the region optimization framework; finally, obtaining the abnormal candidate regions, and inputting the abnormal candidate regions into the identification model for final classification; the specific steps are as follows.

Step 3.2.1: performing abnormal region research on uniaxial data respectively under the data reconstruction framework based on Lagrange multiplication so as to obtain triaxial abnormal regions, which are respectively $O_X$, $O_Y$, $O_Z$.

Step 3.2.2: establishing a triaxial fusion optimization framework:

$$\min(O_X \cup O_Y \cup O_Z), \text{ subject to } O_{Xi} \cup O_{Yj} \cup O_{Zk} \neq \emptyset$$

Step 3.2.3: eliminating overlapping by a non-maximum suppression algorithm while considering the diversity of generation of candidate regions, merging windows which are close with each other, and using the maximum outer boundary of two windows as the outer boundary of a new form, wherein the merging criterion is that: if the transverse center distance of adjacent windows is less than the minimum transverse length of the adjacent windows.

Step 3.3: anomaly identification of MFL in pipelines based on an evolvable model.

Step 3.3.1: extracting abnormal samples from a complete MFL data set, and establishing an anomaly identification model based on the convolutional neural network (CNN).

Figure 11:
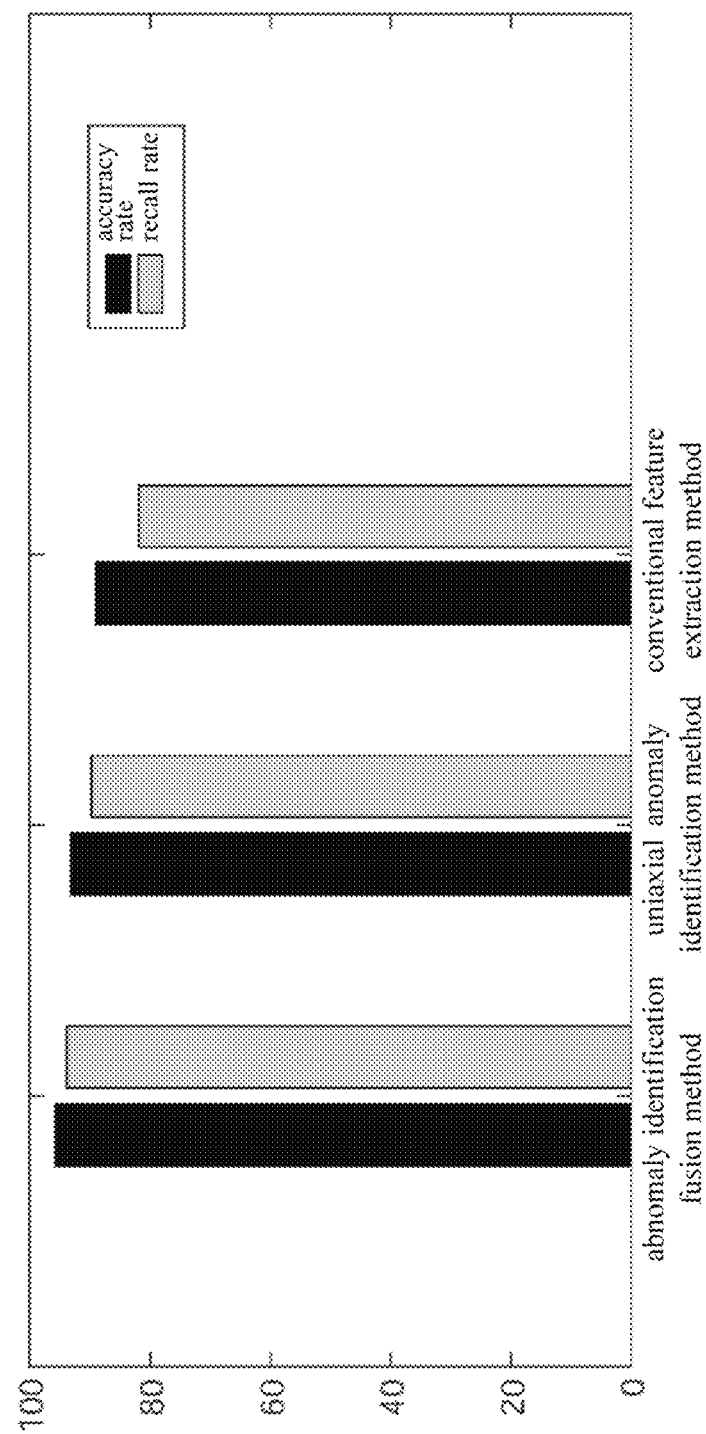
FIG. 11 is a schematic diagram of simulation results of finding out MFL signals with defects in the embodiment of the invention.

Step 3.3.2: For those incorrectly-identified samples, adding new labels, and reinputting the new labels into the model for training, wherein along with the increase of transition data, the identification model is evolving gradually, the simulation results in Step 3, as shown in FIG. 11, compared with a traditional method based on feature extraction, that the accuracy rate is 88.98%, and the recall rate is 81.93%, the pipeline anomaly discovery method proposed by the invention has an accuracy rate of 95.73% and a recall rate of 93.86%; the accuracy rate of uniaxial data anomaly discovery is 93.07%, and the recall rate is 89.73%; it can be seen that the method has better performance.

The quantization module adopts a defect quantization method based on a random forest to obtain the defect size, specifically comprising the following steps.

Step 4.1: collecting data; detecting the defect MFL signals, and extracting features of the MFL signals to obtain the feature values of the defect MFL signals, specifically as follows.

Finding out the peak-valley position and peak-valley value of an MFL signal of axial maximum channel according to the minimum point on the MFL signal of axial maximum channel; after judging and determining as single-peak and double-peak defects, extracting 10 waveform-related features, namely peak value of single-peak defect, Maximum peak-valley difference of single-peak defect, valley width of double-peak defect, left peak-valley difference and right peak-valley difference of double-peak defect signals, peak-to-peak distance of double-peak defect signals, axial spacing between special points, area feature, surface energy feature, defect volume, and defect body energy.

The 10 features are specifically described as follows.

A. peak value of single-peak defect: $Y_v$ is the defect minimum valley value, and $Y_{p-v}$ is the maximum peak-valley difference. Since the defect MFL signals are affected by various factors such as detection environments of the inner detection tool, the baseline of data fluctuates greatly. Taking the peak-valley difference of defect data as a feature quantity can eliminate the influence of the signal baseline well and improve the reliability of quantitative analysis of defects.

B. maximum peak-valley difference of single-peak defect: expression is: $Y_{p-v} = Y_p - Y_v$, wherein $Y_p$ is the peak value of single-peak defect, $Y_v$ is the minimum valley value of defects, and $Y_{p-v}$ is the maximum peak-valley difference. Since the defect MFL signals are affected by various factors such as detection environments of the inner detection tool, the baseline of data fluctuates greatly. Taking the peak-valley difference of defect data as a feature quantity can eliminate the influence of the signal baseline well and improve the reliability of quantitative analysis of defects.

C. valley width of double-peak defect: formulated as: $X_{v-v}=X_{vr}-X_{vl}$, wherein $X_{v-v}$ represents the valley width of an axial signal of defects, $X_{vr}$ is the right valley position of the defects, and $X_{vl}$ is the left valley position of the defects. The valley width of defect signals can reflect the axial distribution of the defect signals.

D. left peak-valley difference and right peak-valley difference of double-peak defect signals: formulated as: $Y_{lp-lv}=Y_{lp}-Y_{lv}$, $Y_{rp-rv}=Y_{rp}-Y_{rv}$, wherein $Y_{lv}$ is the left valley value of MFL signals, $Y_{rv}$ is the right valley value of the MFL signals, $Y_{lp}$ is the left peak value of double-peak signals, $Y_{rp}$ is the right peak value of the double-peak signals, $Y_{lp-lv}$ is the left peak-valley difference, and $Y_{rp-rv}$ is the right peak-valley difference.

E. peak-to-peak distance of double-peak defect signals: formulated as: $X_{p-p}=X_{pr}-X_{pl}$, wherein $X_{pr}$ is the right-peak position, $X_{pl}$ is the left-peak position, and $X_{p-p}$ is the peak-to-peak distance of signals. A combination of the peak-to-peak distance and the peak-valley value of defect signals can roughly determine the shape of an abnormal data curve, which is contribute to quantitative analysis of defect length and depth.

F. axial spacing between special points: in order to obtain the key feature quantity of defect length, the extraction method of special points comprises: setting the proportion m_RateA of rectification, and calculating the threshold according to $X+(Y-X)*m\_RateA$, wherein X is the mean value of valley values, Y is the maximum peak value, two points closest to the threshold in the MFL signal of axial maximum channel s are the special points, and the spacing between special points is the key feature quantity for obtaining the defect length.

G. area feature: A valley value with a lower value is taken as the baseline, the area covered between data curves of two valleys and the baseline is taken and formulated as:

$$S_a = \sum_{t=N_1}^{N_2} \{x(t) - \min[x(t)]\}$$

wherein $S_a$ represents the waveform area of defects; $x(t)$ represents the signal data point of defects; $\min[x(t)]$ represents the minimum valley value of defects; $N_1$ represents the left valley position of defects; $N_2$ represents the right valley position of defects.

H. surface energy feature: the energy of a data curve between two valleys is obtained and formulated as:

$$S_e = \sum_{t=N_1}^{N_2} \{x(t) - \min[x(t)]\}^2$$

wherein, $S_e$ is the defect waveform surface energy.

I. defect volume: The defect volume is obtained by summing the defect areas within a defect channel range, and formulated as:

$$V_a = \sum_{t=n_1}^{n_2} S_a(t)$$

wherein $V_a$ represents the defect volume; $n_1$ represents the starting channel determined by the position of a direction signal at a special point; $n_2$ represents the termination channel determined by the position of a circumferential signal at a special point; and $S_a(t)$ represents the single-channel axial defect area.

J. defect body energy: The defect body energy is obtained by summing the defect surface energy within the defect range, and formulated as:

$$V_e = \sum_{t=n_1}^{n_2} S_e(t)$$

wherein, $V_e$ represents the defect body energy; and $S_e(t)$ represents the surface energy of single-channel axial defect signals.

Step 4.2: using the feature value of the defect MFL signal as a sample; using the manually-measured defect size as a label, wherein the defect size includes the depth, width and length of a defect; manually selecting the initial training set and the testing set.

Step 4.3: training the network; inputting the training set into an initial random forest network.

Step 4.4: adjusting the network; inspecting the results of the random forest regression network through the testing set, and obtaining a final network by adjusting parameters, wherein the specific practice is: inputting $M_h=666$, $N_h=6$, setting the parameters $m_f=\mathrm{sqrt}(\ )$, $T_f=56$, specifically, initially setting the parameter to $n_f=n_f/3$, and setting the maximum feature number, max_features, to be None.

Step 4.4.1: selecting $m_e$ defect samples by a Bootstrapping method by random sampling with replacement from the $M_h \times N_h$ dimension of original MFL signal feature defect samples, with $m_e \leq M_h$, performing samplings for $T_c$ times in total, and generating $T_c$ training sets.

Step 4.4.2: for the $T_c$ training sets, training $T_c$ regression tree models, respectively.

Step 4.4.3: for a single regression tree model, selecting $n_e$ features from a MFL defect signal feature set, wherein $n_e \leq N$; then performing division each time based on the information gain ratio $$g_R(D, A) = \frac{g(D, A)}{H_A(D)},$$

wherein $H_A(D)$ in the formula represents the entropy of feature A, and $g(D, A)$ represents information gain; selecting the feature with the maximum information gain ratio for division; initially, setting the maximum feature number, max_features, of the parameters as None, that is, without limiting the feature number selected in the network.

Step 4.4.4: every tree keeps division like this, in order to prevent overfitting in the process of division, pruning the regression tree through consideration of the complexity of the regression tree. Pruning is performed by minimizing the loss function $C_\alpha(T)=C(T)+\alpha|T|$, wherein $C(T)$ represents the model's prediction error for the defect size, namely, the degree of fitting, $|T|$ represents model complexity, and $\alpha$ is used to regulate the complexity of the regression tree. The prediction error of the loss function is taken as the value at POF 90% position by using the international POF standards for sea oil transportation. Initially, setting the maximum tree depth, max_depth to be 5.

Step 4.4.5: for model parameter tuning optimization, finding out the optimal parameters by CVGridSearch and K-fold cross-validation, wherein the optimal parameters comprise random forest framework parameter, out-of-bag sample evaluation score $e_{oob}$ and maximum number of iterations, as well as maximum feature number of tree model parameter, i.e. max_features, maximum depth, minimum number of samples required for inner node subdivision and minimum number of samples of leaf nodes.

Step 4.4.6: forming the random forest by a plurality of generated decision trees, for the regression problem network established from defect feature samples, the finally-predicted defect size is determined by the mean value of the predicted values of a plurality of trees.

Step 4.5: inputting the data to be tested into the random forest network adjusted according to Step 4.4, and outputting the predicted defect size, wherein at this time, if the data to be tested is the depth in the defect size, the output size is the depth of the predicted defect size; if the data to be tested is the width in the defect size, the output size is the width of the predicted defect size; if the data to be tested is the length in the defect size, the output size is the length of the predicted defect size, wherein, predicted depth reflects the value at position 80% ranked by the absolute value of error according to the international POF standards for oil pipelines, the formula is: $POF_{80}=\text{sort}(|(y_c-\tilde{y}_c)|) \times 80\%$, wherein $y_c$ and $\tilde{y}_c$ are design depth and predicted depth, respectively. The condition that an intergenerational loss function in iteration $n_p$ is no longer reduced is used as the termination condition of seeking optimum parameters, and the maximum number of iterations n_estimators in the final output of the network is 172.

The simulation results of Step 4 and a performance comparison of the invention with the traditional defect inversion algorithm are as shown in Table 1:

TABLE 1

Performance of defect inversion algorithm:

| Confidence Level (80%) | Length (mm) | Width (mm) | Depth (mm) |
|---|---|---|---|
| Traditional random forest algorithm | 9.26 ± 0.56 | 14.56 ± 0.41 | 0.88 ± 0.25 |
| Inversion algorithm proposed by the invention | 7.52 ± 0.49 | 10.31 ± 0.35 | 0.76 ± 0.11 |

Figure 12:
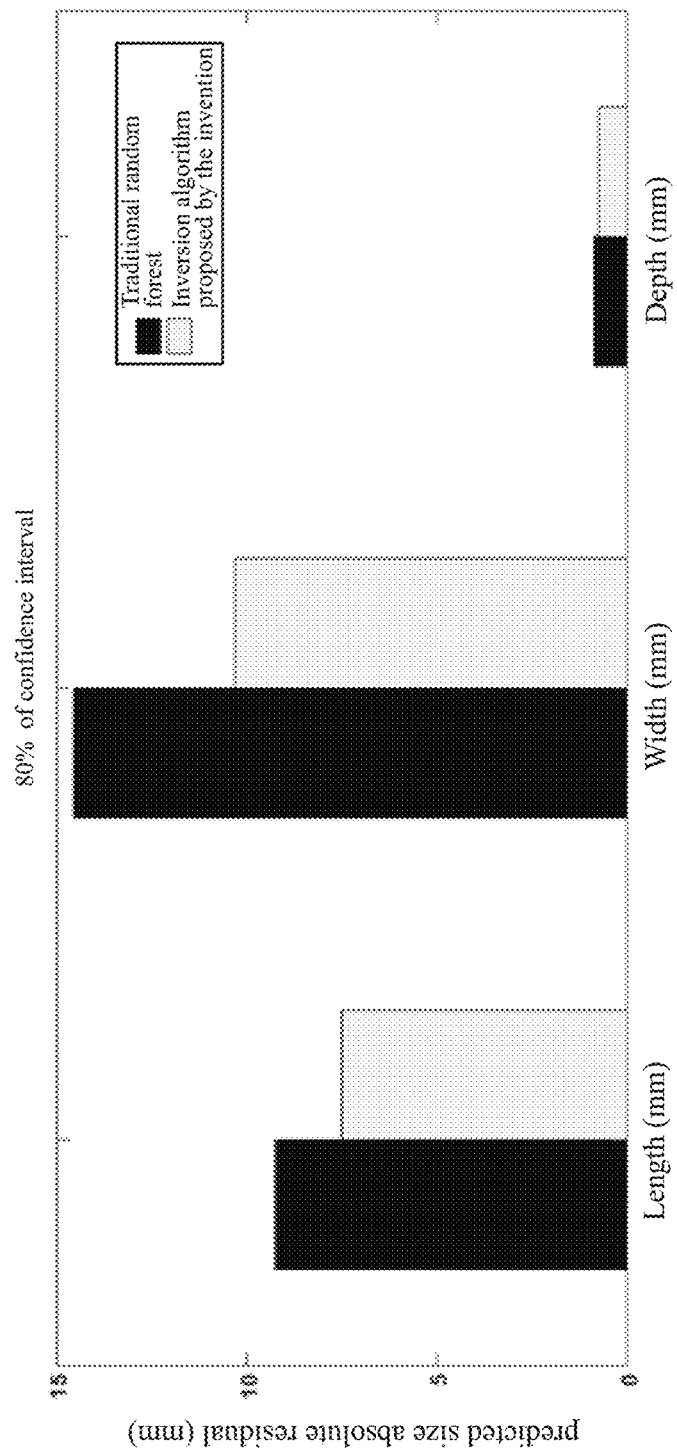
FIG. 12 is a bar chart of quantized performance comparison for defects in the embodiment of the invention.

Table 1 and FIG. 12 reflect the algorithm of the invention according to the international POF standards for offshore oil pipelines. At confidence level of 80%, the absolute length error of a defect is within 10 mm, the width is within 15 mm, and the percentage of absolute depth error to wall thickness (9.5 mm) is within 10. Compared with the traditional random forest algorithm, the precision is higher, the variance is smaller, and the accuracy requirement of industrial defect inversion is met. Experimental results prove that the algorithm has good generalization capability and robustness.

Figure 7:
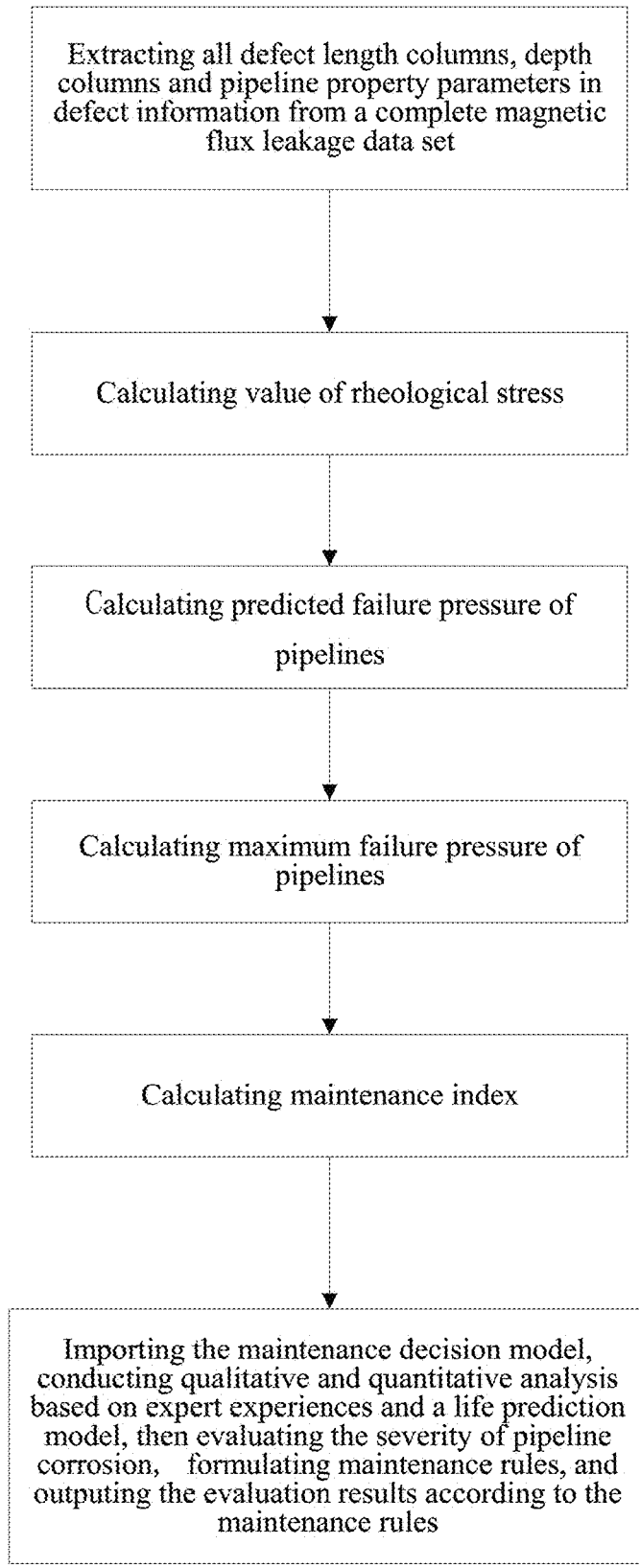
FIG. 7 is a flow chart of a pipeline solution based on improved standard ASME B31G in the embodiment of the invention.
Figure 13:
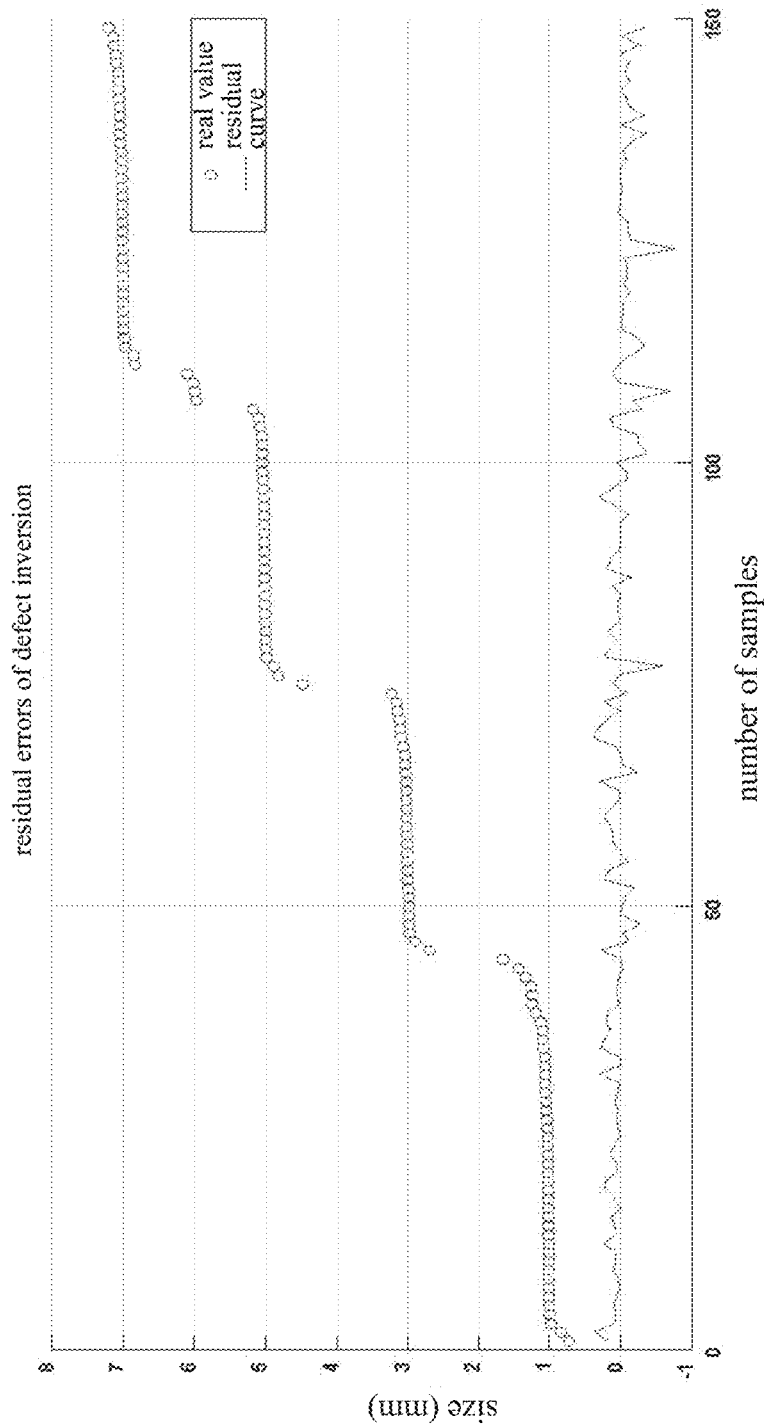
FIG. 13 is a scatter diagram of residual errors of defect inversion in the embodiment of the invention.

It can be seen from FIG. 13 that the quantization results of defect size inversion accuracy and stability are good. Moreover, there is no example of significant deviation from the real point of the predicted point, which is very important for industrial fault detection because if the prediction bias of a defect size is great, serious loss can be caused to subsequent repair measures. The solution module adopts a pipeline solution improved based on the standard ASME B31G, imports the maintenance decision model and outputs the evaluation results, as shown in FIG. 7, specifically comprising the following steps.

Step 5.1: extracting all defect length columns, depth columns and pipeline property parameters in defect information from a complete MFL data set, wherein the pipeline property parameters comprise minimum yield strength SMYS, minimum tensile strength SMTS, nominal outside diameter $D_d$, wall thickness $t_a$ and maximum allowable operating pressure MAOP.

Step 5.2: calculating the value $$S_{flow} = \frac{3SMYS + 0.4SMTS}{3}$$

of rheological stress, wherein SMYS is the minimum yield strength of the pipe in Mpa, and SMTS is the minimum tensile strength in Mpa.

Step 5.3: calculating the predicted failure pressure $$S_F = S_{flow} \times \frac{\left(1 - \frac{A_{area}}{A_{area0}}\right)}{\left(1 - \frac{A_{area}}{A_{area0}L_0}\right)}$$

of pipelines, when z≤20, the length expansion coefficient $$L_0 = (1 + \mu z + \beta z^2)^{\frac{1}{2}},$$

when z>20, the length expansion coefficient $L_0=(\eta z+\lambda_a)$, $$z = \frac{L^2}{D_d t_a},$$

the metal loss area $$A_{area} = \frac{2}{3}dL$$

in a corrosion area, and the original area $A_{area0}=t_a L$, wherein d is the defect depth in mm; $t_a$ is the pipeline wall thickness in mm; $D_d$ is the nominal outside diameter in mm.

Step 5.4: calculating the maximum failure pressure $$P_f = S_F \times \frac{2t_a}{D_d}$$

of the pipeline, reorganizing and getting:

$$P_f = \frac{2t_a}{D_d} \times S_{flow} \times \frac{\left(1 - \theta_a \frac{d}{t_a}\right)}{\left(1 - \theta_a \frac{d}{t_a L_0}\right)},$$

when z≤20, $\theta_a=\frac{2}{3}$ when z>20, $\theta_a=1$.

Step 5.5: calculating the maintenance index $$ERF = \frac{P}{P_f},$$

wherein $$P = \frac{2t_a}{D_d} \times SMYS,$$

P is the maximum allowable design pressure; if the maintenance index ERF is less than 1, it indicates that the defect is acceptable; if ERF is greater than or equal to 1, the defect is unacceptable, and then the pipe should be maintained or replaced.

Step 5.6: importing the maintenance decision model, conducting qualitative and quantitative analysis based on expert experiences and a life prediction model, then evaluating the severity of pipeline corrosion, formulating maintenance rules, and outputting the evaluation results according to the maintenance rules, comprising: maintenance index and maintenance recommendations; wherein rule 1: the maximum depth of wall thickness loss at the defect, which is greater than or equal to 80%, is considered as major corrosion, and maintenance is recommended: the pipe needs to be maintained or replaced immediately, rule 2: the ERF at the defect is greater than or equal to 1, which is considered as severe corrosion, maintenance is recommended: the pipe needs to be maintained immediately, rule 3: the ERF at the defect is greater than or equal to 0.95 and less than 1.0, which is considered as general corrosion, maintenance is recommended: the defect can be observed for 1-3 months, rule 4: the maximum depth at the defect is greater than or equal to 20% and less than 40%, which is considered as minor corrosion, maintenance is recommended: the defect can be observed regularly without treatment.

Figure 14:
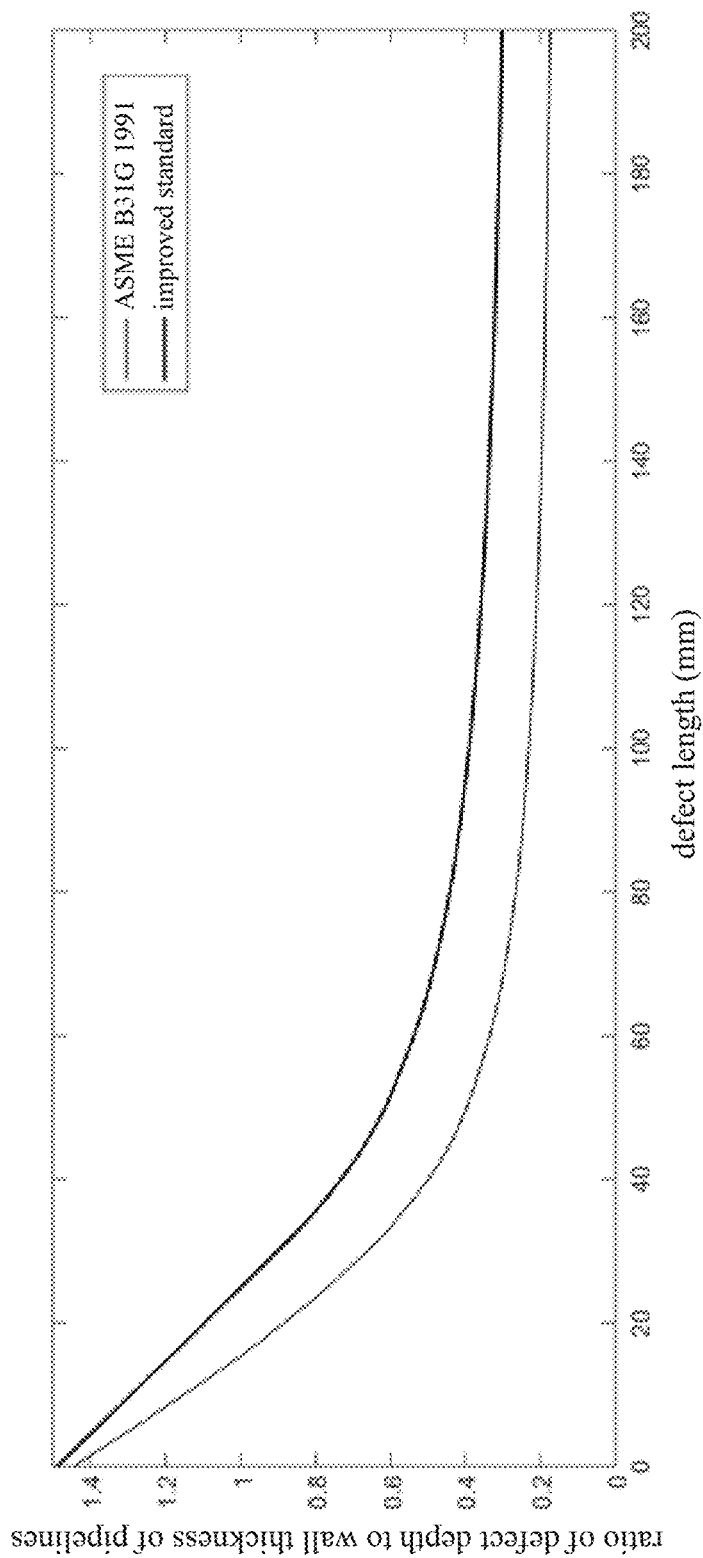
FIG. 14 is an appraisal curve of comparison of ASME B31G 1991 and improved standard residual strength in the embodiment of the invention.

For simulation results of Step 5, the curve as shown in FIG. 14 is drawn by bringing the basic pipeline parameter information into ASME B31G 1991 and the improved standard, respectively, and the improved formula reduces conservatism by changing the value of rheological stress. The curve in the figure is the curve of the maintenance index ERF=1. If the defect is located at the top of the curve, it indicates that the defect is seriously corroded and needs to be repaired immediately. The standard ASME B31G 1991 is too conservative, maintenance or pipe replacement efforts are often increased in the actual detection process, resulting in economic waste, which is applicable to old pipelines. Since the improved formula is less conservative, cost caused by frequent maintenance is reduced.

What is claimed is:

1. An intelligent analysis method for inner detecting magnetic flux leakage (MFL) data in pipelines, comprising the steps of:

connecting originally-sampled MFL data collected directly from a MFL detection tool of submarine pipelines with a complete data set building module, connecting the complete data set building module with a discovery module through a complete MFL data set, connecting the discovery module with a quantization module, and connecting the quantization module with a solution module;

using the complete data set building module for data missing reconstruction and noise reduction operation on original MFL data for inner detection, and adopting a complete data set building method based on a time-domain-like sparse sampling and KNN-softmax to build the complete MFL data set by the complete data set building module;

using the originally-sampled MFL data in the complete data set building module as multi-source data information, specifically comprising: axial data, radial data, circumferential data and α-direction data;

using the discovery module for defect detection that comprises component detection and anomaly detection, wherein the component detection completes detection of welds and flanges of pipeline connecting components;

for the discovery module, adopting a pipeline connecting component discovery method based on a combination of a selective search and a convolutional neural network (CNN) to obtain a precise position of a weld;

dividing whole MFL signals into patches according to the precise position of the weld, and taking one patch of MFL signals to find out MFL signals with defects by an abnormal candidate region search and identification method based on a Lagrange multiplication framework and a multi-source MFL data fusion, wherein the anomaly detection comprises: detection of defects, valves, meters and metal increment, and finally obtaining defect signals;

completing mapping from the defect signals to physical characteristics by the quantization module, and finally giving a defect size, namely length, width and depth, by a defect quantization method based on a random forest; and extracting all defect length columns, depth columns and pipeline property parameters in defect information from the complete MFL data set by the solution module, and finally giving evaluation results including maintenance indexes and recommendations for a single defect position, by using a pipeline solution improved based on the standard ASME B31G through a maintenance decision model; and performing maintenance on the pipeline based on the evaluation results.

2. The intelligent analysis method according to claim 1, wherein the pipeline property parameters comprise minimum yield strength SMYS, minimum tensile strength SMTS, nominal outside diameter $D_d$, wall thickness $t_a$ and maximum allowable operating pressure MAOP.

3. The intelligent analysis method according to claim 1, wherein the complete data set building method based on the time-domain-like sparse sampling and KNN-softmax is adopted in the complete data set building module to obtain the complete MFL data set, specifically comprises the following steps of:

Step 1.1: collecting original MFL detection data directly from the MFL detection tool of submarine pipelines, and performing a secondary baseline correction on data, wherein the originally-sampled MFL data is used as multi-source data information, specifically comprising: the axial data, the radial data, the circumferential data and the α-direction data;

Step 1.1.1: performing a primary baseline correction on the original MFL detection data, which is expressed as:

$$x'_{i_a j_a} = x_{i_a j_a} - \frac{1}{k_c} \sum_{i_a=1}^{k} x_{i_a j_a} + s(j_a = 1, 2, \ldots, n_a)$$

wherein, $k_c$ is the number of mileage count points, $x_{i_a j_a}$ is an original value of channel $j_a$ in the position of mileage count point $i_a$, $x'_{i_a j_a}$ is a corrected value of channel $j_a$ in the position of mileage count point $i_a$, s is a median value of all channels, and $n_a$ is the number of channels of a MFL inner detection tool;

Step 1.1.2: removing an over-limit value $\pm T_a$ in the data, and assigning a position value of the over-limit value to the median value s of all channels, which is expressed as:

$$x'_{i_a j_a} = s, \text{ if } x'_{i_a j_a} > |T_a|$$

Step 1.1.3: performing the secondary baseline correction on data with the over-limit value removed:

$$x''_{i_a j_a} = x'_{i_a j_a} - \frac{1}{k_c}\sum_{i_a=1}^{k} x'_{i_a j_a} + s' (j_a = 1, 2, \ldots, n_a)$$

wherein, $k_c$ is the number of mileage count points, $x'_{i_a j_a}$ is a primary correction value of channel $j_a$ in the position of mileage count point $i_a$, $x''_{i_a j_a}$ is a value of channel $j_a$ in the position of the mileage count point $i_a$ after secondary correction, and s' is a median value of all channels after primary correction;

Step 1.2: performing a time-domain-like sparse sampling anomaly detection treatment on data after the secondary baseline correction;

Step 1.2.1: performing an abnormal signal time-domain-like modeling on data after the secondary baseline correction, namely corresponding the sampling points to time information;

Step 1.2.1.1: performing a mathematical modeling on anomaly parts, wherein the modeling result is represented as:

$$f(t)' = p(t)' * \sin(2\pi n f t)$$

wherein $$p(t)' = \begin{cases} 1, t \in [0, t_1] \cup [t_2, 0.2] \\ a, t \in (t_1, t_2) \end{cases}$$

wherein p(t)' represents a voltage swell compensating signal of MFL detection in pipelines, f represents a signal sampling rate, t represents a sampling time, $t_1, t_2$ represents sampling intervals, a represents power pipelines, n is a system fluctuation amplitude coefficient, and f(t) is a voltage waveform change frequency;

Step 1.2.1.2: setting a variation of abnormal data of MFL detection by using a range as a collection unit, regarding the variance of pipeline system voltage data collected in each range as the data variation by using $k_e$ collected data as one range, and judging the degree of voltage signal fluctuation of MFL data, a specific calculation method comprises the steps:

$$\Delta f_0^2 = \sum_{i=1}^{k_e}(f_i - \bar{f})^2 / k_e$$

namely $$\Delta f_0 = \sqrt{\sum_{i_c=1}^{k_e}(f_{i_c} - \bar{f})^2 / k_e}$$

wherein $f_{i_c}$ represents sampling point $i_c$ within a given range, $\bar{f}$ represents a mean value of pipeline system voltage data collected within the range, and $\Delta f_0$ represents the degree of voltage signal fluctuation of MFL data;

Step 1.2.1.3: calculating a voltage state variation $\Delta f_{i_c}$, wherein the formula is as follows:

$$\Delta f_{i_c} = \sqrt{\sum_{i_c=2}^{k_e}(f_{i_c} - f_1)^2 / (k_e - 1)}$$

Step 1.2.2: judging abnormal signals, if $\Delta f_{i_c} > 3*\Delta f_0$, regarding data at this time as an anomaly generated by external disturbance, which is an anomaly part;

Step 1.2.3: manually extracting the training sample features $T = (X_1, X_2, \ldots, X_7, X_{i_b})$; manually extracting the testing sample features $T' = (X'_1, X'_2, \ldots, X'_7, X'_{j_b})$; and manually extracting features $T'' = (X''_1, X''_2, \ldots, X''_7, X''_{k_d})$ of the data to be interpolated, wherein $i_b, j_b, k_d$ is the number of features;

Step 1.3: performing a missing interpolation treatment based on KNN-logistic regression on the MFL data of submarine pipelines;

Step 1.3.1: training and testing the KNN and softmax regression models;

Step 1.3.1.1: dividing the feature sample data T into two parts, wherein one part of the feature sample data $X_{Train}$ is used for training the KNN model, and the other part of the feature sample data $T_{Test}$ is used for testing the KNN model;

Step 1.3.1.2: inputting $X_{Train}$ into the KNN model, setting the value of K, and training the KNN model;

Step 1.3.1.3: inputting $T_{Test}$ into the trained KNN model for classification, calculating a discrimination error rate, if the error rate is less than a threshold, changing the training and testing samples by a V-fold cross-validation method, and continuing performing training; else, making K=K+1, continuing training the model, and stopping training when K is greater than the threshold M;

Step 1.3.1.4: (for the feature sample data $T_{i_d}$ ($i_d=1, \ldots, m_d$) assigned to each category, the data set corresponding to the feature sample is $D_{i_d}$ ($i_d=1, \ldots, m_d$)) normalizing $T_{i_d}$ ($i_d=1, \ldots, m_d$) and $D_{i_d}$ ($i_d=1, \ldots, m_d$) respectively to obtain $T'_{i_d}$ ($i_d=1, \ldots, m_d$) and $D'_{i_d}$ ($i_d=1, \ldots, m_d$), expressed as:

$$T'_{i_d} = \frac{T_{i_d} - \overline{T_{i_d}}}{\max(T_{i_d}) - \min(T_{i_d})}, \quad D'_{i_d} = \frac{D_{i_d} - \overline{D_{i_d}}}{\max(D_{i_d}) - \min(D_{i_d})}$$

$\overline{T_{i_d}}$ is a mean value of feature sample data, and $\overline{D_{i_d}}$ is a mean value of data corresponding to the feature sample;

Step 1.3.1.5: adding a softmax regression model at a node of each class, wherein a hypothesis function is expressed in the formula:

$$h_\theta(x^{i_e}) = \begin{pmatrix} p(y^{(i_e)} = 1 \mid x^{(i_e)}; \theta) \\ p(y^{(i_e)} = 2 \mid x^{(i_e)}; \theta) \\ M \\ p(y^{(i_e)} = k_f \mid x^{(i_e)}; \theta) \end{pmatrix}$$

wherein, x is a sample input value, y is a sample output value, θ is a training model parameter, $k_f$ is a vector dimension, $i_e$ is category $i_e$ in the classification, and $p(y=i_e|x)$ represents an estimated probability value for category $i_e$;

Step 1.3.1.6: inputting the training sample set D'$_{i_d}$ at each node into the softmax regression model to obtain the output value $y^{(i_e)'}$ after interpolation, wherein a loss function J(θ) is:

$$J(\theta) = -\frac{1}{m_d}\left[\sum_{i_e=1}^{m_d}\sum_{j_e=1}^{k_f} 1\{y^{(i_e)} = j_e\}\log \frac{e^{\theta_{j_e}^T x^{(i_e)}}}{\sum_{l=1}^{k_f} e^{\theta_{j_e}^T x^{(i_e)}}}\right]$$

wherein x is the sample input value, y is the sample output value, θ is the training model parameter, $k_f$ is the vector dimension, $i_e$ is category $i_e$ in the classification, $j_e$ is sample input $j_e$ in the classification, $m_d$ is the number of samples, 1{•} is an indicative function, and, if value in braces is the true value, the expression value is 1;

Step 1.3.2: calculating the loss function of the predicted result, and setting the threshold to be P, if J(θ)>P, returning to the Step 1.3.2.2, making K=K+1, and continuing training the model, until J(θ)≤P, when K is greater than the threshold M, stopping training, and outputting the output value $y^{(i)'}$ after interpolation; and Step 1.3.3: inputting the data features and data sets to be interpolated into the trained model to realize interpolation of missing data so as to obtain the complete MFL data set, wherein because the originally-sampled MFL data is used as the multi-source data information, a complete multi-source MFL data set is obtained.

4. The intelligent analysis method according to claim 1, wherein the discovery module adopts the pipeline connecting component discovery method based on the combination of the selective search and the convolutional neural network (CNN) to obtain the precise position of a weld, specifically comprising the following steps of:

Step 2.1: extracting the MFL signal data of a pipeline: from a complete MFL data set, dividing a whole MFL signal matrix D into $n_g$ patches of the pipeline MFL signal matrix $D_1, D_2, \ldots, D_{n_g}$ in an equal proportion, wherein each divided MFL signal matrix consists of $M_{n_g} \times N_{n_g}$ data;

Step 2.2: color diagram of MFL signal conversion: setting an upper limit $A_{top}$ of a signal amplitude and a lower limit $A_{floor}$ of the signal amplitude, and converting pipeline MFL signal matrices $D_1, D_2, \ldots, D_{n_g}$ into pipeline color diagram matrices $C_1, C_2, \ldots, C_{n_g}$ accordingly;

Step 2.2.1: setting the upper limit $A_{top}$ of the signal amplitude and the lower limit $A_{floor}$ of the signal amplitude;

Step 2.2.2: converting the pipeline MFL signal matrices $D_1, D_2, \ldots, D_{n_g}$ into gray matrices $Gray_1, Gray_2, \ldots, Gray_{n_g}$ between 0 and 255 according to the following formula:

$$\begin{cases} gray_{ij} = 255, d_{ij} > A_{top} \\ gray_{ij} = \frac{255g(d_{ij} - A_{floor})}{A_{top} - A_{floor}}, A_{floor} < d_{ij} \leq A_{top} \\ gray_{ij} = 0, d_{ij} \leq A_{floor} \end{cases}$$

wherein i∈$M_{n_g}$, j∈$N_{n_g}$, $d_{ij}$ is a component element of the MFL signal matrix D, and $gray_{ij}$ is a component element of the gray matrix Gray;

Step 2.2.3: converting the gray matrices $Gray_1, Gray_2, \ldots, Gray_{n_g}$ into 3D color matrices $C_1, C_2, \ldots, C_{n_g}$ containing $R_1, R_2, \ldots, R_{n_g}, G_1, G_2, \ldots, G_{n_g}$ and $B_1, B_2, \ldots, B_{n_g}$ according to the following formula:

$$\begin{cases} r_{ij} = 0; g_{ij} = 4gray_{ij}, b_{ij} = c \cdot gray_{ij} \leq c/4 \\ r_{ij} = 0; g_{ij} = c; b_{ij} = -4gray_{ij} + 2c \cdot c/4 \leq gray_{ij} \leq c/2 \\ r_{ij} = 4U_{ij} - 2c; g_{ij} = c; b_{ij} = 0 \cdot c/2 \leq gray_{ij} \leq 3c/4 \\ r_{ij} = c; g_{ij} = -4gray_{ij} + 4c; b_{ij} = 0 \cdot 4gray_{ij} > 3c/4 \end{cases}$$

wherein $r_{ij}$ is a component element of the matrix R, $g_{ij}$ is a component element of the matrix G, and $b_{ij}$ is a component element of the matrix B;

Step 2.3: selective search: for the color diagram $C_k$ of each segment of pipeline, extracting $m_c$ candidate regions $r_{k1}, r_{k2}, \ldots r_{km_c}$ by selective search;

Step 2.3.1: for the color diagram $C_k$ of each segment of pipeline, using a division method to obtain a candidate region set $R_k = \{r_{k1}, r_{k2}, \ldots, r_{kw}\}$;

Step 2.3.2: initializing a similarity set Sim=φ;

Step 2.3.3: calculating similarities sim{$r_{ka}, r_{kb}$} of all adjacent regions $r_{ka}, r_{kb}$ according to the following formula:

$$sim(r_{ka}, r_{kb}) = \sum_{K=1}^{N} \min(c_{ka}^K, c_{kb}^K)$$

Step 2.3.4: repeating the Step 2.3.3 until the similarities of all adjacent regions are calculated, and updating the similarity set Sim according to the following formula:

Sim=Sim∪sim($r_{ka}, r_{kb}$)

Step 2.3.5: finding a maximum similarity sim{$r_{kc}, r_{kd}$}=max(Sim) from Sim, and obtaining a merged region accordingly:

$r_{ke} = r_{kc} \cup r_{kd}$ removing sim{$r_{kc}, r_{kd}$} from Sim;

Step 2.3.6: repeating the Step 2.3.5 until Sim is empty so as to obtain me merged regions $r_{k1}, r_{k2}, \ldots r_{km_e}$, wherein the regions are candidate regions;

Step 2.4: convolution neural network: judging the extracted candidate regions by the convolutional neural network (CNN), and recording the position $Loc_1, Loc_2, \ldots, Loc_w$ and the score $Soc_1, Soc_2, \ldots, Soc_w$ of the weld judged by the convolutional neural network (CNN); and Step 2.5: non-maximum suppression: obtaining the precise position $L_1, L_2, \ldots, L_u$ of the weld in the Step 2.4 according to the above position $Loc_1, Loc_2, \ldots, Loc_w$ and score $Soc_1, Soc_2, \ldots, Soc_w$ of the weld seam through a non-maximum suppression algorithm.

5. The intelligent analysis method according to claim 1, wherein according to the precise position of the weld, the whole MFL signals are divided into patches, one patch of MFL signals is taken, the discovery module adopts the abnormal candidate region search and identification method based on the Lagrange multiplication framework and the multi-source MFL data fusion to find out MFL signals with defects, specifically comprising the following steps:

Step 3.1: establishing a data reconstruction framework based on Lagrange multiplication;

Step 3.1.1: establishing a data reconstruction model $$\min_{A,E} \|A\|_* + \lambda \|E\|_1, \text{ subject to } P = A + E,$$

wherein P is an observed matrix, E is an error matrix, A is a low-rank matrix after reconstruction, $\|\bullet\|_1$ represents a 1 norm of the matrix, $\|\bullet\|_*$ represents a nuclear norm of the matrix, and λ is a weight parameter;

Step 3.1.2: changing a constrained optimization model into an unconstrained optimization model, $$l(A,E,Y,\mu) = \|A\|_* + \lambda\|E\|_1 + \langle Y, P-A-E \rangle + \mu/2\|P-A-E\|_F^2$$

wherein l represents an Lagrange function, $\langle \bullet \rangle$ represents an inner product of the matrix, μ is a penalty factor, Y is a Lagrange multiplication matrix, and the unconstrained model minimization problem is solved through an iterative process as follows:

$$\begin{cases} A^{k+1} = \operatorname*{argmin}_A l(A, E, Y), (unchanged E) \\ E^{k+1} = \operatorname*{argmin}_E l(A, E, Y), (unchanged A) \\ Y^{k+1} = Y^k + \mu(P - A^{k+1} - E^{k+1}) \\ \mu^{k+1} = \rho\mu^k \end{cases}$$

Step 3.1.3: iterative optimization, wherein the optimization model of matrix A is:

$$A^{k+1} = \operatorname*{argmin}_A \|A\|_* + \langle Y, P-A-E^k \rangle + \frac{\mu^k}{2}\|P - A - E^k\|_F^2$$

$$= \operatorname*{argmin}_A \|A\|_* + \frac{\mu^k}{2}\left\|A - \left(P - E^k + \frac{Y^k}{\mu^k}\right)\right\|_F^2$$

for the convenience of calculation, the nuclear norm minimization problem can be solved by a soft threshold operator, the calculation formula of the soft threshold is (x, τ)=sgn (x)(|x|−τ)$_+$, wherein y$_+$=max(y,0), the operator can be used in the optimization process as follows:

$$\begin{cases} Usoft(S, \tau)V^T = \operatorname*{argmin}_X \tau\|X\|_* + \frac{1}{2}\|X - Z\|_F^2 \\ \operatorname{soft}(Z, \tau) = \operatorname*{argmin}_X \tau\|X\|_1 + \frac{1}{2}\|X - Z\|_F^2 \end{cases}$$

wherein $USV^T$ is singular value decomposition of the matrix Z, for $\forall Z \in R^{m \times n}$, $U \in R^{m \times r}$ and $V \in R^{r \times n}$, r is a rank of the matrix, therefore, the optimization problem of the matrix A is transformed into $$A^{k+1} = U^k \operatorname{soft}\left(P - E^k + \frac{Y^k}{\mu^k}, \frac{1}{\mu^k}\right)V^k,$$

and similarly, the optimization problem of the matrix E is transformed into $$E^{k+1} = \operatorname{soft}\left(P - A^{K+1} + \frac{Y^k}{\mu^k}, \frac{\lambda}{\mu^k}\right);$$

Step 3.1.4: setting an iteration cut-off condition, wherein the cut-off condition is:

$$\frac{\|S \cdot (P - A_k - E_k)\|_F}{\|S \cdot P\|_F} < \varepsilon$$

wherein S is a weight matrix, and the application of the S weight matrix can greatly shorten an iteration time, thereby increasing a detection speed;

Step 3.2: abnormal candidate region search in pipelines based on multi-data fusion;

Step 3.2.1: performing an abnormal region research on uniaxial data respectively under the data reconstruction framework based on the Lagrange multiplication to obtain triaxial abnormal regions $O_X$, $O_Y$, $O_Z$;

Step 3.2.2: establishing a triaxial fusion optimization framework:

$$\min(O_X \cup O_Y \cup O_Z), \text{ subject to } O_{Xi} \cup O_{Yj} \cup O_{Zk} \neq \emptyset$$

Step 3.2.3: eliminating overlapping by a non-maximum suppression algorithm while considering the diversity of generation of candidate regions, merging windows which are close with each other, and using a maximum outer boundary of two windows as an outer boundary of a new form, wherein the merging criterion is that: if a transverse center distance of adjacent windows is less than a minimum transverse length of the adjacent windows;

Step 3.3: anomaly identification of MFL in pipelines based on an evolvable model;

Step 3.3.1: extracting abnormal samples from a complete MFL data set, and establishing an anomaly identification model based on the convolutional neural network (CNN); and Step 3.3.2: for incorrectly-identified samples, adding new labels as new classification, going to the Step 3.3.1, re-establishing the anomaly identification model, performing reclassification, and finding out the MFL signals with defects.

6. The intelligent analysis method according to claim 1, wherein the quantization module adopts the defect quantization method based on the random forest to obtain the defect size, specifically comprising the following steps:

Step 4.1: collecting data: detecting the defect MFL signals, and extracting features of the MFL signals to obtain the feature values of the defect MFL signals, specifically as follows:

finding out a peak-valley position and a peak-valley value of an MFL signal of an axial maximum channel according to a minimum point on the MFL signal of the axial maximum channel; and after judging and determining as single-peak and double-peak defects, extracting 10 waveform-related features, namely a peak value of the single-peak defect, a maximum peak-valley difference of the single-peak defect, a valley width of the double-peak defect, a left peak-valley difference and a right peak-valley difference of double-peak defect signals, a peak-to-peak distance of the double-peak defect signals, an axial spacing between special points, an area feature, a surface energy feature, a defect volume, and a defect body energy, the 10 features are specifically described as follows:

A. the peak value of the single-peak defect: $Y_v$ is a minimum valley value of defects, and $Y_{p-v}$ is a maximum peak-valley difference, since the defect MFL signals are affected by various factors including detection environments of the inner detection tool, a baseline of data fluctuates greatly, the peak-valley difference of defect data is taken as a feature quantity, influence of the signal baseline can be removed well and the reliability of quantitative analysis of defects can be improved;

B. the maximum peak-valley difference of the single-peak defect: expression is: $Y_{p-v}=Y_p-Y_v$, wherein $Y_p$ is the peak value of the single-peak defect, $Y_v$ is the minimum valley value of defects, and $Y_{p-v}$ is the maximum peak-valley difference, since the defect MFL signals are affected by various factors including detection environments of the inner detection tool, the baseline of data fluctuates greatly, the peak-valley difference of defect data is taken as a feature quantity, influence of the signal baseline can be removed well and the reliability of quantitative analysis of defects can be improved;

C. the valley width of the double-peak defect: formulated as: $X_{v-v}=X_{vr}-X_{vl}$, wherein $X_{v-v}$ represents a valley width of an axial signal of defects, $X_{vr}$ is a right valley position of the defects, and $X_{vl}$ is a left valley position of the defects, the valley width of defect signals can reflect an axial distribution of the defect signals;

D. the left peak-valley difference and the right peak-valley difference of the double-peak defect signals: formulated as: $Y_{lp-lv}=Y_{lp}-Y_{lv}$, $Y_{rp-rv}=Y_{rp}-Y_{rv}$, wherein $Y_{lv}$ is a left valley value of MFL signals, $Y_{rv}$ is a right valley value of the MFL signals, $Y_{lp}$ is a left peak value of double-peak signals, $Y_{rp}$ is a right peak value of the double-peak signals, $Y_{lp-lv}$ is a left peak-valley difference, and $Y_{rp-rv}$ is a right peak-valley difference;

E. the peak-to-peak distance of the double-peak defect signals: formulated as: $X_{p-p}=X_{pr}-X_{pl}$, wherein $X_{pr}$ is a right-peak position, $X_{pl}$ is a left-peak position, and $X_{p-p}$ is a peak-to-peak distance of signals, and a combination of the peak-to-peak distance and the peak-valley value of defect signals can roughly determine the shape of an abnormal data curve, which is contribute to quantitative analysis of defect length and depth;

F. the axial spacing between the special points: in order to obtain a key feature quantity of the defect length, an extraction method of the special points comprises: setting a proportion m_RateA of rectification, and calculating the threshold according to X+(Y−X)*m_RateA, wherein X is a mean value of valley values, Y is a maximum peak value, two points closest to the threshold in the MFL signal of the axial maximum channel are the special points, and the spacing between the special points is the key feature quantity for obtaining the defect length;

G. the area feature: a valley value with a lower value is taken as a baseline, an area covered between data curves of two valleys and the baseline is taken and formulated as:

$$S_a = \sum_{t=N_1}^{N_2} \{x(t) - \min[x(t)]\}$$

wherein $S_a$ represents a waveform area of defects; x(t) represents a signal data point of defects, min[x(t)] represents a minimum valley value of defects, $N_1$ represents a left valley position of defects, and $N_2$ represents a right valley position of defects;

H. the surface energy feature: an energy of a data curve between two valleys is obtained and formulated as:

$$S_e = \sum_{t=N_1}^{N_2} \{x(t) - \min[x(t)]\}^2$$

wherein, $S_e$ is a defect waveform surface energy;

I. the defect volume: the defect volume is obtained by summing the defect areas within a defect channel range, and formulated as:

$$V_a = \sum_{t=n_1}^{n_2} S_a(t)$$

wherein $V_a$ represents a defect volume, $n_1$ represents a starting channel determined by the position of a direction signal at a special point, $n_2$ represents a termination channel determined by the position of a circumferential signal at a special point, and $S_a(t)$ represents a single-channel axial defect area; and J. the defect body energy: the defect body energy is obtained by summing the defect surface energy within the defect range, and formulated as:

$$V_e = \sum_{t=n_1}^{n_2} S_e(t)$$

wherein, $V_e$ represents a defect body energy, and $S_e(t)$ represents a surface energy of single-channel axial defect signals;

Step 4.2:

using the feature value of the defect MFL signal as a sample;

using a manually-measured defect size as a label, wherein the defect size includes the depth, width and length of a defect; and manually selecting an initial training set and a testing set;

Step 4.3:

training a network; and inputting the training set into an initial random forest network;

Step 4.4:

adjusting the network; and inspecting the results of a random forest regression network through the testing set, and obtaining a final network by adjusting parameters;

Step 4.4.1: selecting me defect samples by a Bootstrapping method by random sampling with replacement from $M_h \times N_h$ dimension of original MFL signal feature defect samples, with $m_e \leq Mh$, performing samplings for $T_c$ times in total, and generating $T_c$ training sets;

Step 4.4.2: for the $T_c$ training sets, training $T_c$ regression tree models, respectively;

Step 4.4.3:

for a single regression tree model, selecting $n_e$ features from a MFL defect signal feature set, wherein $n_e \leq N$;

then performing division each time based on an information gain ratio $$g_R(D, A) = \frac{g(D, A)}{H_A(D)},$$

wherein $H_A(D)$ in the formula represents an entropy of feature A, and g(D, A) represents an information gain; selecting the feature with the maximum information gain ratio for division; and initially, setting a maximum feature number, max_features, of the parameters to be None, that is, without limiting the feature number selected in the network;

Step 4.4.4: every tree keeps division like this, in order to prevent overfitting in the process of division, pruning the regression tree through consideration of the complexity of the regression tree, wherein the pruning is performed by minimizing a loss function $C_\alpha(T) = C(T) + \alpha|T|$, wherein C(T) represents a model's prediction error of the defect size, namely, the degree of fitting, |T| represents model complexity, and $\alpha$ is used to regulate the regression tree complexity, the prediction error of the loss function is taken as a value at POF 90% position by using the international POF standards for sea oil transportation;

Step 4.4.5: for a model parameter tuning optimization, finding out optimal parameters by CVGridSearch and K-fold cross-validation, wherein the optimal parameters comprise random forest framework parameter, out-of-bag sample evaluation score $e_{oob}$ and maximum number of iterations, as well as maximum feature number of tree model parameter, i.e. max_features, maximum depth, minimum number of samples required for inner node subdivision and minimum number of samples of leaf nodes;

Step 4.4.6: forming the random forest by a plurality of generated decision trees, for the regression problem network established from defect feature samples, a finally-predicted defect size is determined by a mean value of the predicted values of a plurality of trees; and Step 4.5:

inputting the data to be tested in the testing set into the random forest network adjusted according to the Step 4.4, and outputting the predicted defect size, wherein at this time, if the data to be tested is the depth in the defect size, the output size is the depth of the predicted defect size;

if the data to be tested is the width in the defect size, the output size is the width of the predicted defect size;

if the data to be tested is the length in the defect size, the output size is the length of the predicted defect size, wherein, predicted depth reflects a value at a position 80% ranked by the absolute value of error according to the international POF standards for oil pipelines, the formula is: $POF_{80} = \text{sort}(|(y_c - \tilde{y}_c)|) \times 80\%$, wherein $y_c$ and $\tilde{y}_c$ are a design depth and a predicted depth, respectively.

7. The intelligent analysis method according to claim 1, wherein the solution module adopts the pipeline solution improved based on the standard ASME B31G, imports the maintenance decision model and outputs the evaluation results, specifically comprising the following steps:

Step 5.1: extracting all defect length columns, depth columns and pipeline property parameters in defect information from a complete MFL data set, wherein the pipeline property parameters comprise minimum yield strength SMYS, minimum tensile strength SMTS, nominal outside diameter $D_d$, wall thickness $t_a$ and maximum allowable operating pressure MAOP;

Step 5.2: calculating a value $$S_{flow} = \frac{3SMYS + 0.4SMTS}{3}$$

of rheological stress, wherein SMYS is a minimum yield strength of the pipe in Mpa, and SMTS is a minimum tensile strength in Mpa;

Step 5.3: calculating a predicted failure pressure $$S_F = S_{flow} \times \frac{\left(1 - \frac{A_{area}}{A_{area0}}\right)}{\left(1 - \frac{A_{area}}{A_{area0}L_0}\right)}$$

of pipelines, when $z \leq 20$, a length expansion coefficient $$L_0 = (1 + \mu z + \beta z^2)^{\frac{1}{2}},$$

when $z > 20$, the length expansion coefficient $$L_0 = (\eta z + \lambda_a), z = \frac{L^2}{D_d t_a},$$

a metal loss area $$A_{area} = \frac{2}{3} dL$$

in a corrosion area, an original area $A_{area0} = t_a L$, d is a defect depth in mm, $t_a$ is a pipeline wall thickness in mm, and $D_d$ is a nominal outside diameter in mm;

Step 5.4: calculating a maximum failure pressure $$P_f = S_F \times \frac{2t_a}{D_d}$$

of the pipeline, reorganizing and getting:

$$P_f = \frac{2t_a}{D_d} \times S_{flow} \times \frac{\left(1 - \theta_a \frac{d}{t_a}\right)}{\left(1 - \theta_a \frac{d}{t_a L_0}\right)},$$

when $z \leq 20$, $\theta_a = \frac{2}{3}$, and when $z > 20$, $\theta_a = 1$;

Step 5.5:

calculating a maintenance index $$ERF = \frac{P}{P_f}, \text{ wherein } P = \frac{2t_a}{D_d} \times SMYS,$$

P is a maximum allowable design pressure;

if the maintenance index ERF is less than 1, it indicates that the defect is acceptable;

if the ERF is greater than or equal to 1, the defect is unacceptable, and then the pipe should be maintained or replaced; and Step 5.6: importing the maintenance decision model, conducting a qualitative and quantitative analysis based on expert experiences and a life prediction model, then evaluating the severity of pipeline corrosion, formulating maintenance rules, and outputting the evaluation results according to the maintenance rules, comprising: the maintenance index and maintenance recommendations;

wherein rule 1: a maximum depth of wall thickness loss at the defect, which is greater than or equal to 80%, is considered as major corrosion, and maintenance is recommended: the pipe needs to be maintained or replaced immediately, rule 2: the ERF at the defect is greater than or equal to 1, which is considered as severe corrosion, maintenance is recommended: the pipe needs to be maintained immediately, rule 3: the ERF at the defect is greater than or equal to 0.95 and less than 1.0, which is considered as general corrosion, maintenance is recommended: the defect can be observed for 1-3 months, rule 4: the maximum depth at the defect is greater than or equal to 20% and less than 40%, which is considered as minor corrosion, maintenance is recommended: the defect can be observed regularly without treatment.

\* \* \* \* \*